(12) United States Patent
Morgan et al.

(10) Patent No.: US 9,037,162 B2
(45) Date of Patent: May 19, 2015

(54) CONTINUOUS DATA OPTIMIZATION OF NEW ACCESS POINTS IN POSITIONING SYSTEMS

(75) Inventors: Edward J. Morgan, Needham, MA (US); Michael G. Shean, Boston, MA (US); Farshid Alizadeh-Shabdiz, Wayland, MA (US); Russel K. Jones, Medfield, MA (US)

(73) Assignee: Skyhook Wireless, Inc., Boston, MA (US)

(*) Notice: Subject to any disclaimer, the term of this patent is extended or adjusted under 35 U.S.C. 154(b) by 199 days.

(21) Appl. No.: 13/424,750

(22) Filed: Mar. 20, 2012

(65) Prior Publication Data

US 2012/0178477 A1   Jul. 12, 2012

Related U.S. Application Data

(63) Continuation of application No. 12/371,091, filed on Feb. 13, 2009, now Pat. No. 8,140,094, which is a continuation of application No. 11/359,144, filed on Feb. 22, 2006, now Pat. No. 7,493,127, which is a (Continued)

(51) Int. Cl.
*H04W 4/00* (2009.01)
*H04W 64/00* (2009.01)

(Continued)

(52) U.S. Cl.
CPC .............. *H04W 64/003* (2013.01); *G01S 5/02* (2013.01); *G01S 5/0205* (2013.01); *H04W 4/02* (2013.01); *H04W 4/20* (2013.01); *H04W 64/00* (2013.01); *H04W 84/10* (2013.01); *H04W 88/08* (2013.01)

(58) Field of Classification Search
CPC . H04W 64/00; H04W 4/02; H04W 29/08657; G06K 7/0008
USPC .............. 455/456.5, 456.6, 456.1; 340/572.1
See application file for complete search history.

(56) References Cited

U.S. PATENT DOCUMENTS

| 3,881,060 A | 4/1975 | Connell et al. |
|---|---|---|
| 4,310,726 A | 1/1982 | Asmuth |

(Continued)

FOREIGN PATENT DOCUMENTS

| CA | 2056203 | 7/1992 |
|---|---|---|
| EP | 493896 | 8/1992 |

(Continued)

OTHER PUBLICATIONS

"Terminal Equipment and Protocols for Telematic Services: Information Technology—Digital Compression and Coding of Continuous—Tome Still Images—Requirements and Guidelines," International Telecommunication Union, Sep. 1992.

(Continued)

*Primary Examiner* — Danh Le
(74) *Attorney, Agent, or Firm* — Cesari and McKenna, LLP

(57) ABSTRACT

Methods and systems of continuously optimizing data in WiFi positioning systems. A location-based services system uses WiFi-enabled devices to monitor WiFi access points in a target area to indicate whether a WiFi access point is newly-observed. A WiFi-enabled device communicates with WiFi access points within range of the WiFi-enabled device so that observed WiFi access points identify themselves. A reference database is accessed to obtain information specifying a recorded location for each observed WiFi access point in the target area. Observed WiFi access points for which the reference database has no information specifying a corresponding recorded location are identified. The recorded location information for each of the observed WiFi access points is used to calculate the position of the WiFi-enabled device. The reference database is informed of the WiFi access points (for which there was no information in the database) and is provided the calculated position in conjunction therewith.

36 Claims, 6 Drawing Sheets

Related U.S. Application Data continuation-in-part of application No. 11/261,988, filed on Oct. 28, 2005, now Pat. No. 7,305,245.

(60) Provisional application No. 60/654,811, filed on Feb. 22, 2005.

(51) Int. Cl.

| | | |
|---|---|---|
| *G01S 5/02* | (2010.01) | |
| *H04W 4/20* | (2009.01) | |
| *H04W 4/02* | (2009.01) | |
| *H04W 84/10* | (2009.01) | |
| *H04W 88/08* | (2009.01) | |

(56) References Cited

U.S. PATENT DOCUMENTS

| | | |
|---|---|---|
| 4,415,771 A | 11/1983 | Martinez |
| 4,757,267 A | 7/1988 | Riskin |
| 4,924,491 A | 5/1990 | Compton et al. |
| 4,991,176 A | 2/1991 | Dahbura et al. |
| 5,043,736 A | 8/1991 | Darnell et al. |
| 5,095,505 A | 3/1992 | Finucane et al. |
| 5,119,504 A | 6/1992 | Durboraw, III |
| 5,136,636 A | 8/1992 | Wegrzynowicz |
| 5,161,180 A | 11/1992 | Chavous |
| 5,235,630 A | 8/1993 | Moody et al. |
| 5,235,633 A | 8/1993 | Dennison et al. |
| 5,315,636 A | 5/1994 | Patel |
| 5,353,023 A | 10/1994 | Mitsugi |
| 5,379,337 A | 1/1995 | Castillo et al. |
| 5,389,935 A | 2/1995 | Drouault et al. |
| 5,414,432 A | 5/1995 | Penny, Jr. et al. |
| 5,564,121 A | 10/1996 | Chow et al. |
| 5,940,825 A | 8/1999 | Castelli et al. |
| 5,946,615 A | 8/1999 | Holmes et al. |
| 6,134,448 A | 10/2000 | Shoji et al. |
| 6,134,491 A | 10/2000 | Kawagoe et al. |
| 6,246,884 B1 | 6/2001 | Karmi et al. |
| 6,249,252 B1 | 6/2001 | Dupray |
| 6,262,741 B1 | 7/2001 | Davies |
| 6,272,405 B1 | 8/2001 | Kubota et al. |
| 6,393,294 B1 | 5/2002 | Perez-Breva et al. |
| 6,438,491 B1 | 8/2002 | Farmer |
| 6,484,034 B1 | 11/2002 | Tsunehara et al. |
| 6,625,647 B1 | 9/2003 | Barrick, Jr. et al. |
| 6,664,925 B1 | 12/2003 | Moore et al. |
| 6,665,658 B1 | 12/2003 | DaCosta et al. |
| 6,674,403 B2 | 1/2004 | Gray et al. |
| 6,678,611 B2 | 1/2004 | Khavakh et al. |
| 6,741,188 B1 | 5/2004 | Miller et al. |
| 6,754,488 B1 | 6/2004 | Won et al. |
| 6,757,518 B2 | 6/2004 | Spratt et al. |
| 6,789,102 B2 | 9/2004 | Gotou et al. |
| 6,799,049 B1 | 9/2004 | Zellner et al. |
| 6,862,524 B1 | 3/2005 | Nagda et al. |
| 6,888,811 B2 | 5/2005 | Eaton et al. |
| 6,915,123 B1 | 7/2005 | Daudelin et al. |
| 6,915,128 B1 | 7/2005 | Oh |
| 6,946,950 B1 | 9/2005 | Ueno et al. |
| 6,956,527 B2 | 10/2005 | Rogers et al. |
| 6,978,023 B2 | 12/2005 | Dacosta |
| 6,990,351 B2 | 1/2006 | Tsunehara et al. |
| 6,990,428 B1 | 1/2006 | Kaiser et al. |
| 7,042,391 B2 | 5/2006 | Meunier et al. |
| 7,046,657 B2 | 5/2006 | Harrington et al. |
| 7,116,988 B2 | 10/2006 | Dietrich et al. |
| 7,120,449 B1 | 10/2006 | Muhonen et al. |
| 7,123,928 B2 | 10/2006 | Moeglein et al. |
| 7,130,642 B2 | 10/2006 | Lin |
| 7,130,646 B2 | 10/2006 | Wang |
| 7,155,239 B2 | 12/2006 | Zeng et al. |
| 7,167,715 B2 | 1/2007 | Stanforth |
| 7,167,716 B2 | 1/2007 | Kim et al. |
| 7,197,556 B1 | 3/2007 | Short et al. |
| 7,206,294 B2 | 4/2007 | Garahi et al. |
| 7,242,950 B2 | 7/2007 | Suryanarayana et al. |
| 7,250,907 B2 | 7/2007 | Krumm et al. |
| 7,254,405 B2 | 8/2007 | Lin et al. |
| 7,257,411 B2 | 8/2007 | Gwon et al. |
| 7,269,427 B2 | 9/2007 | Hoctor et al. |
| 7,271,765 B2 | 9/2007 | Stilp et al. |
| 7,299,058 B2 | 11/2007 | Ogino |
| 7,305,245 B2 | 12/2007 | Alizadeh-Shabdiz et al. |
| 7,317,914 B2 | 1/2008 | Adya et al. |
| 7,319,878 B2 | 1/2008 | Sheynblat et al. |
| 7,323,991 B1 * | 1/2008 | Eckert et al. ............... 340/572.1 |
| 7,333,816 B2 | 2/2008 | Filizola et al. |
| 7,373,154 B2 | 5/2008 | Sharony et al. |
| 7,389,114 B2 | 6/2008 | Ju et al. |
| 7,397,424 B2 | 7/2008 | Houri |
| 7,403,762 B2 | 7/2008 | Morgan et al. |
| 7,412,246 B2 | 8/2008 | Lewis et al. |
| 7,414,988 B2 | 8/2008 | Jones et al. |
| 7,417,961 B2 | 8/2008 | Lau |
| 7,426,197 B2 | 9/2008 | Schotten et al. |
| 7,433,673 B1 | 10/2008 | Everson et al. |
| 7,433,694 B2 | 10/2008 | Morgan et al. |
| 7,433,696 B2 | 10/2008 | Dietrich et al. |
| 7,440,755 B2 | 10/2008 | Balachandran et al. |
| 7,471,954 B2 | 12/2008 | Brachet et al. |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,519,372 B2 | 4/2009 | MacDonald et al. |
| 7,525,484 B2 | 4/2009 | Dupray et al. |
| 7,551,579 B2 | 6/2009 | Alizadeh-Shabdiz et al. |
| 7,551,929 B2 | 6/2009 | Alizadeh-Shabdiz et al. |
| 7,616,965 B2 | 11/2009 | Rudravaram et al. |
| 7,636,576 B1 | 12/2009 | Pfister et al. |
| 7,672,675 B2 | 3/2010 | Pande et al. |
| 7,706,814 B2 | 4/2010 | Sillasto et al. |
| 7,764,231 B1 | 7/2010 | Karr et al. |
| 7,768,963 B2 | 8/2010 | Alizadeh-Shabdiz |
| 7,769,396 B2 | 8/2010 | Alizadeh-Shabdiz et al. |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,916,661 B2 | 3/2011 | Alizadeh-Shabdiz et al. |
| 7,948,433 B2 | 5/2011 | Seatovic et al. |
| 8,014,788 B2 | 9/2011 | Alizadeh-Shabdiz et al. |
| 8,019,357 B2 | 9/2011 | Alizadeh-Shabdiz et al. |
| 8,090,386 B2 | 1/2012 | Alizadeh-Shabdiz et al. |
| 8,103,288 B2 | 1/2012 | Alizadeh-Shabdiz et al. |
| 8,106,828 B1 | 1/2012 | Do et al. |
| 8,144,673 B2 | 3/2012 | Alizadeh-Shabdiz |
| 8,185,129 B2 | 5/2012 | Alizadeh-Shabdiz |
| 8,229,455 B2 | 7/2012 | Alizadeh-Shabdiz |
| 8,244,272 B2 | 8/2012 | Morgan et al. |
| 8,315,233 B2 | 11/2012 | Alizadeh-Shabdiz |
| 8,340,685 B2 | 12/2012 | Cochran et al. |
| 8,369,264 B2 | 2/2013 | Brachet et al. |
| 2001/0022558 A1 | 9/2001 | Karr et al. |
| 2001/0053999 A1 | 12/2001 | Feinberg |
| 2002/0055956 A1 | 5/2002 | Krasnoiarov et al. |
| 2002/0080063 A1 | 6/2002 | Bloebaum et al. |
| 2002/0154056 A1 | 10/2002 | Gaal et al. |
| 2002/0173317 A1 | 11/2002 | Nykanen et al. |
| 2002/0184331 A1 | 12/2002 | Blight et al. |
| 2003/0043073 A1 | 3/2003 | Gray et al. |
| 2003/0069024 A1 | 4/2003 | Kennedy |
| 2003/0087647 A1 | 5/2003 | Hurst |
| 2003/0114206 A1 | 6/2003 | Timothy et al. |
| 2003/0125045 A1 | 7/2003 | Riley et al. |
| 2003/0146835 A1 | 8/2003 | Carter |
| 2003/0225893 A1 | 12/2003 | Roese et al. |
| 2004/0019679 A1 | 1/2004 | E et al. |
| 2004/0039520 A1 | 2/2004 | Khavakh et al. |
| 2004/0058640 A1 | 3/2004 | Root et al. |
| 2004/0068364 A1 | 4/2004 | Zhao et al. |
| 2004/0072577 A1 | 4/2004 | Myllymaki et al. |
| 2004/0081133 A1 | 4/2004 | Smavatkul et al. |
| 2004/0087317 A1 | 5/2004 | Caci |

(56) References Cited

U.S. PATENT DOCUMENTS

| | | |
|---|---|---|
| 2004/0102192 A1 | 5/2004 | Serceki |
| 2004/0124977 A1 | 7/2004 | Biffar |
| 2004/0157624 A1 | 8/2004 | Hrastar |
| 2004/0162896 A1 | 8/2004 | Cen et al. |
| 2004/0193367 A1 | 9/2004 | Cline |
| 2004/0203847 A1 | 10/2004 | Knauerhase et al. |
| 2004/0203904 A1 | 10/2004 | Gwon et al. |
| 2004/0204063 A1 | 10/2004 | Van Erlach |
| 2004/0205234 A1 | 10/2004 | Barrack et al. |
| 2004/0263388 A1 | 12/2004 | Krumm et al. |
| 2005/0020266 A1 | 1/2005 | Backes et al. |
| 2005/0021781 A1 | 1/2005 | Sunder et al. |
| 2005/0037775 A1 | 2/2005 | Moeglein et al. |
| 2005/0043040 A1 | 2/2005 | Contractor |
| 2005/0055374 A1 | 3/2005 | Sato |
| 2005/0108306 A1 | 5/2005 | Martizano Catalasan |
| 2005/0113107 A1* | 5/2005 | Meunier ............... 455/456.1 |
| 2005/0136845 A1 | 6/2005 | Masuoka et al. |
| 2005/0164710 A1 | 7/2005 | Beuck |
| 2005/0192024 A1 | 9/2005 | Sheynblat |
| 2005/0227711 A1 | 10/2005 | Orwant et al. |
| 2005/0232189 A1 | 10/2005 | Loushine |
| 2005/0251326 A1 | 11/2005 | Reeves |
| 2006/0002326 A1 | 1/2006 | Vesuna |
| 2006/0009235 A1* | 1/2006 | Sheynblat et al. ......... 455/456.1 |
| 2006/0040640 A1 | 2/2006 | Thompson et al. |
| 2006/0046709 A1 | 3/2006 | Krumm et al. |
| 2006/0058957 A1 | 3/2006 | Hickenlooper et al. |
| 2006/0058958 A1 | 3/2006 | Galbreath et al. |
| 2006/0061476 A1 | 3/2006 | Patil et al. |
| 2006/0078122 A1 | 4/2006 | Dacosta |
| 2006/0089157 A1 | 4/2006 | Casey et al. |
| 2006/0089160 A1 | 4/2006 | Othmer |
| 2006/0092015 A1 | 5/2006 | Agrawal et al. |
| 2006/0128397 A1 | 6/2006 | Choti et al. |
| 2006/0161634 A1* | 7/2006 | Tseng ........................... 709/217 |
| 2006/0197704 A1 | 9/2006 | Luzzatto et al. |
| 2006/0200843 A1 | 9/2006 | Morgan et al. |
| 2006/0221918 A1 | 10/2006 | Wang |
| 2006/0240840 A1 | 10/2006 | Morgan et al. |
| 2006/0270421 A1 | 11/2006 | Phillips et al. |
| 2006/0293064 A1 | 12/2006 | Robertson et al. |
| 2007/0004428 A1 | 1/2007 | Morgan et al. |
| 2007/0077945 A1 | 4/2007 | Sheynblat |
| 2007/0097511 A1 | 5/2007 | Das et al. |
| 2007/0100955 A1 | 5/2007 | Bodner |
| 2007/0110053 A1 | 5/2007 | Soni et al. |
| 2007/0121560 A1 | 5/2007 | Edge |
| 2007/0126635 A1 | 6/2007 | Houri |
| 2007/0150516 A1 | 6/2007 | Morgan et al. |
| 2007/0178911 A1 | 8/2007 | Baumeister et al. |
| 2007/0184846 A1 | 8/2007 | Horton et al. |
| 2007/0210961 A1 | 9/2007 | Romijn |
| 2007/0232892 A1 | 10/2007 | Hirota |
| 2008/0004888 A1 | 1/2008 | Davis et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008121 A1 | 1/2008 | Alizadeh-Shabdiz |
| 2008/0033646 A1 | 2/2008 | Morgan et al. |
| 2008/0045234 A1 | 2/2008 | Reed |
| 2008/0108371 A1 | 5/2008 | Alizadeh-Shabdiz et al. |
| 2008/0132170 A1 | 6/2008 | Alizadeh-Shabdiz et al. |
| 2008/0133124 A1 | 6/2008 | Sarkeshik |
| 2008/0133336 A1 | 6/2008 | Altman et al. |
| 2008/0139219 A1 | 6/2008 | Boeiro et al. |
| 2008/0176583 A1 | 7/2008 | Brachet et al. |
| 2008/0188242 A1 | 8/2008 | Carlson et al. |
| 2008/0248741 A1 | 10/2008 | Alizadeh-Shabdiz |
| 2008/0248808 A1 | 10/2008 | Alizadeh-Shabdiz |
| 2008/0261622 A1 | 10/2008 | Lee et al. |
| 2008/0288493 A1 | 11/2008 | Yang et al. |
| 2009/0017841 A1 | 1/2009 | Lewis et al. |
| 2009/0075672 A1 | 3/2009 | Jones et al. |
| 2009/0149197 A1 | 6/2009 | Morgan et al. |
| 2009/0175189 A1 | 7/2009 | Alizadeh-Shabdiz et al. |
| 2009/0286504 A1 | 11/2009 | Krasner et al. |
| 2009/0286549 A1 | 11/2009 | Canon et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0052983 A1 | 3/2010 | Alizadeh-Shabdiz |
| 2011/0021207 A1 | 1/2011 | Morgan et al. |
| 2011/0034179 A1 | 2/2011 | David et al. |
| 2011/0035420 A1 | 2/2011 | Alizadeh-Shabdiz et al. |
| 2011/0045840 A1 | 2/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0084881 A1 | 4/2011 | Fischer |
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0007775 A1 | 1/2012 | Alizadeh-Shabdiz |
| 2012/0071175 A1 | 3/2012 | Skibiski et al. |
| 2012/0100872 A1 | 4/2012 | Alizadeh-Shabdiz et al. |
| 2012/0108260 A1 | 5/2012 | Alizadeh-Shabdiz |
| 2012/0112958 A1 | 5/2012 | Alizadeh-Shabdiz et al. |
| 2012/0178477 A1 | 7/2012 | Morgan et al. |
| 2012/0196621 A1 | 8/2012 | Alizadeh-Shabdiz et al. |
| 2012/0280866 A1 | 11/2012 | Alizadeh-Shabdiz |
| 2012/0284118 A1 | 11/2012 | Mamich, Jr. et al. |
| 2012/0309420 A1 | 12/2012 | Morgan et al. |
| 2013/0072227 A1 | 3/2013 | Morgan et al. |

FOREIGN PATENT DOCUMENTS

| | | |
|---|---|---|
| EP | 1359714 | 11/2003 |
| JP | 03-235562 | 10/1991 |
| JP | 04-035345 | 2/1992 |
| WO | WO-03/021851 | 3/2003 |
| WO | WO-04/002185 | 12/2003 |
| WO | WO-2004/036240 | 4/2004 |
| WO | WO-2005/004527 | 1/2005 |
| WO | WO-2007/081356 | 7/2007 |
| WO | WO-2007/101107 | 9/2007 |
| WO | WO-2011/119575 | 9/2011 |
| WO | WO-2011/156549 | 12/2011 |

OTHER PUBLICATIONS

Curran, et al., "Pinpointing Users with Location Estimation Techniques and Wi-Fi Hotspot Technology," International Journal of Network Management, 2008, DOI: 10.1002/nem.683, 15 pages.

Griswold et al., "ActiveCampus—Sustaining Educational Communities through Mobile Technology." UCSD CSE Technical Report #CS200-0714, 2002, 19 pages.

Hazas, M., et al., "Location-Aware Computing Comes of Age," IEEE, vol. 37, Feb. 2004, pp. 95-97.

Hellebrandt, M., et al., "Estimating Position and Velocity of Mobile in a Cellular Radio Network," IEEE Transactions on Vehicular Technology, vol. 46, No. 1, Feb. 1997, pp. 65-71.

International Search Report and Written Opinion of the International Searching Authority, the United States Patent and Trademark Office, for International Application No. PCT/US2008/058345, dated Jun. 30, 2008, 6 pages.

International Search Report and Written Opinion of the International

(56) References Cited

OTHER PUBLICATIONS

Searching Authority, the United States Patent and Trademark Office, for International Application No. PCT/US2010/045438, dated Oct. 6, 2010, 9 pages.
International Search Report and Written Opinion of the International Searching Authority, The United States Patent and Trademark Office, for International Application No. PCT/US2011/029379, dated Jun. 1, 2011, 15 pages.
International Search Report and Written Opinion of the International Searching Authority, The United States Patent and Trademark Office, for International Application No. PCT/US2011/039717, dated Dec. 20, 2011; 13 pages.
International Search Report and Written Opinion of the International Searching Authority, the United States Patent and Trademark Office, for PCT/US2006/07299, dated Feb. 11, 2008, 7 pages.
International Search Report and Written Opinion of the Searching Authority, the United States Patent and Trademark Office, for International Application No. PCT/US2006/045327, dated Jun. 24, 2008, 6 pages.
International Search Report and Written Opinion, International Patent Application No. PCT/US08/87969, mailed Mar. 10, 2009 (7 pages).
International Search Report, International Application No. PCT/US05/39208, mailed Jan. 29, 2008, 3 pages.
International Search Report, International Application No. PCT/US07/81929, mailed Apr. 16, 2008, 2 pages.
International Search Report, International Application No. PCT/US07/62721, mailed Nov. 9, 2007, 3 pages.
Kawabata, K. et al., "Estimating Velocity Using Diversity Reception," IEEE, 1994, pp. 371-374.
Kim, M., et al., "Risks of using AP locations discovered through war driving,"; Pervasive Computing, May 19, 2006, pp. 67-81.
Kirsner, S., "One more way to find yourself," The Boston Globe, May 23, 2005, Retrieved from www.boston.com, 2 pages.
Krumm, J., et al., "LOCADIO: Inferring Motion and Location from WLAN Signal Strengths," Proc. of Mobiquitous, Aug. 22-26, 2004, 10 pages.
Kwan, M., "Graphic Programming Using Odd or Even Points," Chinese Math. 1, 1960. (273-277).
LaMarca, A., et al., "Place Lab: Device Positioning Using Radio Beacons in the Wild,"; Pervasive Computing, Oct. 2004, pp. 116-133.
LaMarca, A., et al., "Self-Mapping in 802.11 Location Systems," Ubicomp 2005: Ubiquitous Computing, Aug. 23, 2005, pp. 87-104.
Muthukrishnan, K., et al., "Towards Smart Surroundings: Enabling Techniques and Technologies for Localization," Lecture Notes in Computer Science, vol. 3479, May 2005, 11 pages.
Schilit, et al., "Challenge: Ubiquitous Location-Aware Computing and the "Place Lab" Initiative," WMASH'03, Sep. 2003, San Diego, CA, 7 pages.
Supplementary European Search Report for European Application No. 07757413, dated Apr. 6, 2010, 10 pages.
Written Opinion of the International Searching Authority, International Application No. PCT/US05/39208, mailed Jan. 29, 2008. (3 pages).
Zhou, R. "Wireless Indoor Tracking System (WITS)," Jul. 2006, retrieved on May 11, 2011 from the internet: <URLhttp://www.ks.uni-freiburg.de/assist/rui/index.php?page=publications>, entire document, 15 pages.
Ambrosch, Wolf-Dietrich et al., "The Intelligent Network: A Joint Study by Bell Atlantic, IBM and Siemens, Chapter 9. ERS Service Description", 1989, pp. 162-177.
Bahl, Paramvir et al. "RADAR: An In-Building RF-based User Location and Tracking System", Microsoft Research, 2000, pp. 1-10.
Bahl, Paramvir et al. "A Software System for Locating Mobile Users: Design, Evaluation, and Lessons", Microsoft Research, University of California at San Diego, 2000, pp. 1-13.
Balachandran, Anand, et al., "Wireless Hotspots: Current Challenges and Future Directions," WMASH'03, San Diego, California, ACM, Sep. 19, 2003, pp. 1-9.
Battiti, Roberto, et al., "Wireless LANs: From WarChalking to Open Access Networks," Mobile Networks and Applications 10, Springer Science + Business Media, Inc., The Netherlands, Jun. 2005, pp. 275-287.
Bhasker, Ezekiel S. et al. "Employing User Feedback for Fast, Accurate, Low-Maintenance Geolocationing", Department of Computer Science and Engineering, University of California, San Diego, 2004, pp. 1-10.
Bjorndahl, Per, et al. "CME20—A Total Solution for GSM Networks", Ericsson Review No., 3, Jun. 1991, pp. 72-79.
"Bluesoft, Inc.'s Aeroscout," Bluesoft, Inc., available at least as early as Aug. 2003, 1 page.
Brackenridge, Eloise, "The New Urban Infrastructure: Cities and Telecommunications", University of Texas at Austin, Center for Research on Communication, Technology and Society, 1990, pp. 77-100.
Buccafurno, Mary, "The Philadelphia Story", TE&M Special Report 911, Dec. 15, 1987, pp. 68-72.
Byers, Simon, et al., "802.11B Access Point Mapping," Communications of the ACM, vol. 46, No. 5, ACM, May 2003, pp. 41-46.
"California Legislature Senate Committee on Energy and Public Utilities and Joint Committee on Fire, Police, Emergency and Disaster Services, Joint Interim Hearing on the 911 Emergency Response System—An Overview of its Effectiveness," Los Angeles California, Nov. 21, 1990, pp. 1-107.
Castro, Paul, et al. "A Probabilistic Room Location Service fro Wireless Networked Environments" Ubicomp 2001: Ubiquitous Computing, Intl. Conference Atlanta, GA, Sep. 30-Oct. 2, 2001, pp. 19-34.
Chawathe, Yatin et al., "A Case Study in Building Layered DHT Applications", Intel Research Seattle, University of California, San Diego, Intel Research Berkeley, ICSI, 2005, pp. 1-15.
Cheng, Yu-Chung et al., "Accuracy Characterization for Metropolitan-scale Wi-Fi Localization" University of California, San Diego; Intel Research Seattle; Microsoft Corporation, 2005, pp. 1-13.
Connelly, Kay et al., "A Toolkit for Automatically Construction Outdoor Radio Maps" Proceedings of the Intl. Conference on Information Technology, Coding and Computing, Apr. 2005, pp. 1-7.
Dayharsh, Thomas et al., "Update on the National Emergency No. 911", IEEE Transactions on Vehicular Technology, vol. VT-28, No. 4, Nov. 1979, pp. 1-6.
Delong, Edgar S. Jr. "Making 911 even better" Telephony Integrating Voice and Data Communications, an Intertec Publication, Dec. 14, 1987, pp. 60-63.
"Delta Encoding", Wikipedia, retrieved from http://en.wikipedia.org/wiki/Delta_encoding, Mar. 2006, pp. 1-5.
Denigris, Ernest, et al. "Enhanced 911: emergency calling with a plus" Bell Laboratories Record, Mar. 1980, pp. 74-79.
Eckerson, Wayne, "Users test toll-free net access options", Management Strategies, Network World, Dec. 30, 1991-Jan. 6, 1992, pp. 17-18.
"Ekahau, Ekahau Client 3.0," available at least as early as Oct. 2003, pp. 1-6.
"Ekahau, Ekahau Positioning Engine 2.1," available at least as early as Oct. 2003, pp. 1-9.
"Ekahau, Ekahau Site Survey 1.0," available at least as early as Oct. 2003, pp. 1-4.
Elnahrawy, Eiman, et al. "Using Areabased Presentations and Metrics for Localization Systems in Wireless LANs" Proceedings of the 29th Annual IEEE Intl. Conference on Local Computer Networks, IEEE Computer Society Press LCN'04, Nov. 2004, pp. 1-9.
Frederickson, Greg N., "Approximation Algorithms for Some Postman Problems," Journal of the Association for Computing Machinery, vol. 26, No. 3, Jul. 1979, pp. 538-554.
Griswold, William G., et al., "ActiveCampus: Experiments in Community-Oriented Ubiquitous Computing," IEEE Computer Society, Oct. 2004, pp. 1-9.
Harvey, Dean et al. "Call Center Solutions" Intelligent Networking: Business Communications Systems, AT&T Technical Journal, vol. 70, No. 5, Sep./Oct. 1991, pp. 1-11.
Hatami, Ahmad et al. "A Comparative Performance Evaluation of RSS-Based Positioning Algorithms Used in WLAN Networks" 2005

(56) References Cited

OTHER PUBLICATIONS

IEEE Wireless Communications and Networking Conference, IEEE Communications Society, WCNC vol. 4, Mar. 13-17, 2005, pp. 1-8.
Head, Charles, "Intelligent Network: A Distributed System" IEEE Communications Magazine, Dec. 1988, pp. 16-20.
Henderson, Tristan, et al., "The Changing Usage of a Mature Campus-wide Wireless Network," ACM, MobiCom '04, Philadelphia, Pennsylvania, USA, Sep. 26-Oct. 1, 2004, pp. 1-15.
Hightower, Jeffrey et al., "A Survey and Taxonomy of Location Systems for Ubiquitous Computing", University of Washington, Aug. 24, 2001, pp. 1-29.
Hong, Jason I., et al., "Privacy and Security in the Location-enhanced World Wide Web," In Proceedings of the Workshop on Privacy at Ubicomp, 2003, Oct. 2003, pp. 1-5.
Honig, William et al. "The Realities of Service Creation on Switching Systems Through Attached Processors" XII International Switching Symposium, vol. VI, May 27-Jun. 1, 1990, pp. 51-54.
"Huffman Coding", Wikipedia, retrieved from http://en.wikipedia.org/wiki/Huffman_coding, Mar. 2006, pp. 1-10.
Hunter, Paul, "The Sources of Innovation in New Jersey Bell Switching Services," Master of Science Thesis, Massachusetts Institute of Technology, Jun. 1991, pp. 1-105.
Hurley, Chris et al., "War Driving Drive, Detect, Defend a Guide to Wireless Security", Syngress Publishing, Inc., 2004, pp. 1-515.
"Implementing 9-1-1 Systems in Texas: Legal and Institutional Background" Texas Advisory Commission on Intergovernmental Relations, Jun. 1998, pp. 1-61.
International Search Report and Written Opinion of the International Searching Authority, The United States Patent and Trademark Office, for International Application No. PCT/US2006/06041, dated Nov. 16, 2007, 4 pages.
Jin, Ming-Hui et al., "802.11-based Positioning System for Context Aware Applications" GLOBECOM, IEEE 2003, 2003, pp. 1-5.
Kang, Jong Hee et al. "Extracting Places from Traces of Locations" Dept. of Computer Science and Engineering, University of Washington, WMASH '04, Oct. 1, 2004, pp. 110-118.
Kent, C. A. et al., "Position Estimation of Access Points in 802.11 Wireless Network" Lawrence Livermore National Laboratory, Jan. 21, 2004, pp. 1-10.
Kirtner, Jody L., M. A., et al., "The Application of Land Use/Land Cover Data to Wireless Communication System Design," EDX Engineering, Inc., http://proceedings.esri.com/library/userconf/proc98/PROCEED/TO550/PAP525/P525.HTM, 1998, pp. 1-16.
Komar, Can, et al., "Location Tracking and Location Based Service Using IEEE 802.11 WLAN Infrastructure," European Wireless 2004, Barcelona Spain, Feb. 24-27, 2004, pp. 1-7.
Krumm, J., et al., "LOCADIO: Inferring Motion and Location from Wi-Fi Signal Strengths," First Annual International Conference on Mobile and Ubiquitous Systems: Networking and Services, Aug. 2004, 10 pages.
Krumm, John et al. "The NearMe Wireless Proximity Server" UbiComp 2004, LNCS 3205, 2004, pp. 283-300.
Kwan, Robert K., "GLOBALSTAR: Linking the World via Mobile Connections", IEEE Intl Symposium on Personal, Indoor & Mobile Radio Communications, Sep. 24-25, 1991, pp. 318-323.
Lamarca, Anthony, et al., "Finding Yourself: Experimental Location Technology Relies on Wi-Fi and Cellphone Signals Instead of Orbiting Satellites," Resources, IEEE Spectrum, Dec. 2004, pp. 1-3.
Lamarca, Anthony, et al., "Place Lab: Bootstrapping Where-ware," http://www.powershow.com/view/aae05-ZGI1Y/Place_Lab_Bootstrapping_Whereware_powerpoint_ppt_presentation, 2003, pp. 1-19.
Lamarca, Anthony, et al., "Place Lab's First Step: A Location-Enhanced Conference Guide," Demonstration at UbiComp 2003, Oct. 2003, pp. 1-3.
Letchner, Julia, et al., "Large-Scale Localization from Wireless Signal Strength," Proc. of the National Conference on Artificial Intelligence (AAAI), American Association for Artificial Intelligence, Jul. 2005, pp. 1-6.

"LocalePoints," Newbury Networks, available at least as early as Oct. 2004, 1 page.
LocaleServer, Newbury Networks, available at least as early as Oct. 2004, 1 page.
Lorinez, Konrad et al., "MoteTrack: A Robust, Decentralized Approach to RFBased Location Tracking" LoCA 2005, LNCS 3479, May 2005, pp. 63-82.
Mallinder, Bernard J.T., "The Final Countdown to GSM", 1991 Pan European Digital Cellular Radio Conference, Acropolis Conference Center, Nice, France, Feb. 5, 1991, pp. 1-12.
"PanGo Mobile Applications Suite," Pango, available at least as early as Aug. 2003, pp. 1-2.
"PanGo Proximity Platform," Pango, available at least as early as Oct. 2003, pp. 1-2.
Papadimitriou, Christos H., "On the Complexity of Edge Traversing," Journal of the Association for Computing Machinery, vol. 23, No. 3, Jul. 1976, pp. 544-554.
Robinson, Michael et al. "Received Signal Strength Based Location Estimation of a Wireless LAN Client" 2005 IEEE Wireless Communications and Networking Conference, IEEE Communications Society, WCNC vol. 4, Mar. 13-17, 2005, pp. 1-6.
Saha, Siddhartha et al. "Location Determination of a Mobile Device Using IEEE 802.11b Access Point Signals" 2003 IEEE Wireless Communications and Networking Conference, IEEE Communications Society, Mar. 16-20, 2003, pp. 1987-1992.
Schilit, Bill N. et al., "Bootstrapping the Location-enhanced Word Wide Web" Intel Research Seattle; University of Washington; University of California at San Diego; University of California at Berkeley, 2003, pp. 1-4.
Schilit, Bill, Location Enhanced Web Services, "Computer Science & Engineering Colloquium Series," Intel Research, Seattle, transcript by Henderson Legal Services, Inc., 2003, pp. 1-58.
Shipley, Peter, "802.11b War Driving and LAN Jacking", DEFCON 9 Conference, Las Vegas, Nevada, USA, Jul. 13-15, 2001, pp. 1-39.
Shipley, Peter, "Open WLANs the early results of war Driving" DEFCON9 Conference 802.11b War Driving Presentation, Jul. 13, 2001, pp. 1-49.
*Skyhook Wireless, Inc. v. Google, Inc.*, Amended Complaint for Patent Infringement against Google, Inc., filed by Skyhook Wireless, Inc. (with Exhibits A-M) filed in the United States District Court of Massachusetts, Case No. 1:10-cv-11571-RWZ, on Mar. 29, 2013, pp. 1-291.
*Skyhook Wireless, Inc. v. Google, Inc.*, Amended Document by Google, Inc. Amendment to Preliminary Non-Infringement Contentions filed in the United States District Court of Massachusetts, Case No. 1:10-cv-11571-RWZ, on Nov. 13, 2012, pp. 1-13.
*Skyhook Wireless, Inc. v. Google, Inc.*, Answer to Complaint, with Jury Demand, Counterclaim against Skyhook Wireless, Inc. by Google, Inc. filed in the United States District Court of Massachusetts, Case No. 1:10-cv-11571-RWZ, on Oct. 29, 2010, pp. 1-9.
*Skyhook Wireless, Inc. v. Google, Inc.*, Answer to Counterclaim by Skyhook Wireless, Inc. filed in the United States District Court of Massachusetts, Case No. 1:10-cv-11571-RWZ, on May 8, 2013, pp. 1-6.
*Skyhook Wireless, Inc. v. Google, Inc.*, Complaint for Patent Infringement Against Google, Inc. by Skyhook Wireless, Inc. (with Exhibits A-D, Civil Cover Sheet and Category Sheet) filed in the United States District Court of Massachusetts, Case No. 1:10-cv-11571-RWZ, on Sep. 15, 2010, pp. 1-89.
*Skyhook Wireless, Inc. v. Google, Inc.*, Defendant Google Inc.'s Answer to Amended Complaint, Counterclaim against Skyhook Wireless, Inc. by Google, Inc. (with Exhibit A) filed in the United States District Court of Massachusetts, Case No. 1:10-cv-11571-RWZ, on Apr. 24, 2013, pp. 1-62.
*Skyhook Wireless, Inc. v. Google, Inc.*, First Amended Preliminary Invalidity Disclosures by Google, Inc. (with Exhibits A-B) filed in the United States District Court of Massachusetts, Case No. 1:10-cv-11571-RWZ, on Sep. 10, 2013, pp. 1-389.
*Skyhook Wireless, Inc. v. Google, Inc.*, Joint Claim Construction and Prehearing Statement by Skyhook Wireless, Inc. (with 49 Exhibits) filed in the United States District Court of Massachusetts, Case No. 1:10-cv-11571-RWZ, on Oct. 13, 2011, pp. 1-744.

(56) References Cited

OTHER PUBLICATIONS

*Skyhook Wireless, Inc.* v. *Google, Inc.*, Judge Rya W. Zobel: Memorandum & Decision entered granting in part and denying in part Motion for Summary Judgment filed in the United States District Court of Massachusetts, Case No. 1:10-cv-11571-RWZ, on Sep. 14, 2012, pp. 1-37.

*Skyhook Wireless, Inc.* v. *Google, Inc.*, Memorandum of Decision filed in the United States District Court of Massachusetts, Case No. 1:10-cv-11571-RWZ, on Mar. 6, 2014, pp. 1-30.

*Skyhook Wireless, Inc.* v. *Google, Inc.*, Motion for Partial Summary Judgment Google's Motion for Partial Summary Judgment of Invalidity for Indefiniteness Under 35 U.S.C. § 112 ¶ 2 (with Exhibit A) filed in the United States District Court of Massachusetts, Case No. 1:10-cv-11571-RWZ, on Sep. 12, 2013, pp. 1-4.

*Skyhook Wireless, Inc.* v. *Google, Inc.*, Motion for Summary Judgment of Indefiniteness by Google, Inc. filed in the United States District Court of Massachusetts, Case No. 1:10-cv-11571-RWZ, on Sep. 14, 2011, pp. 1-4.

*Skyhook Wireless, Inc.* v. *Google, Inc.*, Notice by Google, Inc. of Preliminary Invalidity Contentions (with Exhibit A) filed in the United States District Court of Massachusetts, Case No. 1:10-cv-11571-RWZ, on Apr. 15, 2011, pp. 1-81.

*Skyhook Wireless, Inc.* v. *Google, Inc.*, Preliminary Claim Construction Briefs by Skyhook Wireless, Inc. and Affidavit in Support re: Preliminary Claim Construction Briefs (with 15 Exhibits) filed in the United States District Court of Massachusetts, Case No. 1:10-cv-11571-RWZ, on Sep. 14, 2011, pp. 1-185.

*Skyhook Wireless, Inc.* v. *Google, Inc.*, Opposition re Motion for Summary Judgment of Indefiniteness and Skyhook's Reply Claim Construction Brief filed by Skyhook Wireless, Inc. & Affidavit of Samuel K. Lu re: Opposition to Motion by Skyhook Wireless, Inc. (with Exhibits A-M) & Affidavit of Dr. David Kotz re Opposition to Motion by Skyhook Wireless, Inc. (with 1 Exhibit) filed in the United States District Court of Massachusetts, Case No. 1:10-cv-11571-RWX, on Sep. 28, 2011, pp. 1-358.

*Skyhook Wireless, Inc.* v. *Google, Inc.*, Preliminary Invalidity Disclosures by Google, Inc. (with Exhibits A-I) filed in the United States District Court of Massachusetts, Case No. 1:10-cv-11571-RWZ, on Jun. 14, 2013, pp. 1-1629.

*Skyhook Wireless, Inc.* v. *Google, Inc.*, Preliminary Invalidity and Non-Infringement Contentions by Google, Inc. filed in the United States District Court of Massachusetts, Case No. 1:10-cv-11571-RWZ, on Jun. 14, 2013, pp. 1-50.

*Skyhook Wireless, Inc.* v. *Google, Inc.*, Preliminary Invalidity and Non-Infringement Contentions by Google, Inc. (with 1 Exhibit) filed in the United States District Court of Massachusetts, Case No. 1:10-cv-11571-RWZ, on Oct. 7, 2011, pp. 1-108.

*Skyhook Wireless, Inc.* v. *Google, Inc.*, Reply to Preliminary Claim Construction Briefs by Google, Inc. & Declaration of Catherine R. Murphy in Support of Google Inc.'s Opposition to Skyhook Wireless, Inc.'s Opening Claim Construction Brief by Google, Inc. (with Exhibits A-C) filed in the United States District Court of Massachusetts, Case No. 1:10-cv-11571-RWZ, on Sep. 28, 2011, pp. 1-61.

*Skyhook Wireless, Inc.* v. *Google, Inc.*, Reply to Response to Motion for Summary Judgment of Indefiniteness filed by Google, Inc. & Declaration re Reply to Response to Motion for Summary Judgment of Indefiniteness by Google, Inc. (with 5 Exhibits) filed in the United States District Court of Massachusetts, Case No. 1:10-cv-11571-RWZ, on Oct. 18, 2011, pp. 1-235.

*Skyhook Wireless, Inc.* v. *Google, Inc.*, Response by Skyhook Wireless, Inc. to Sealed document Google's Opening Claim Construction Brief filed in the United States District Court of Massachusetts, Case No. 1:10-cv-11571-RWZ, on Sep. 16, 2013, pp. 1-34.

*Skyhook Wireless, Inc.* v. *Google, Inc.*, Second Amended Invalidity Disclosures for the Skyhook II Patents by Google, Inc. (with Exhibits A-G) filed in the United States District Court of Massachusetts, Case No. 1:10-cv-11571-RWZ, on Apr. 30, 2014, pp. 1-1235.

Spielman, Sue and Philip Brittan, "Java and GIS, Part 1: Intro to GIS," Feb. 16, 2004, pp. 1-4.

Spielman, Sue and Simon Brown, "Java and GIS, Part 2: Mobile LBS," Apr. 1, 2004, pp. 1-6.

Sterling, David et al. "The Iridium System—A Revolutionary satellite Communications System Developed with Innovative Applications of Technology", IEEE Communications Society, MILCOM '91,1991, pp. 0436-0440.

Taheri, Ali, et al. Location Fingerprinting on Infrastructure 802.11 Wireless Local Area Networks (WLANs) using Locus, 29th Conference on Local Computer Networks, IEEE Communications Society, Nov. 16-18, 2004, pp. 1-9.

Wallace, Bob, "Domino's delivers using new call routing service" Network World, vol. 8, No. 32, Aug. 12, 1991, pp. 1-2.

"Wardriving as a Proxy for Wi-Fi GPS Location" Netstumbler Blog Posting, http://www.netstumbler.org/news/wardriving-as-a-proxy-for-wi-fi-gps-locationt10762.html, May 2004, pp. 1-7.

Workman, Alexandra et. al. "International Applications of AT&T's Intelligent Network Platforms", AT&T Technical Journal, 1991, vol. 70, No. 34, 1991, pp. 4-57.

Supplementary European Search Report, European Application No. 08866698.7-1857/2235980, PCT/US2008/087969, Applicant: Skyhook Wireless, Inc., Date of Mailing: Jul. 17, 2014, pp. 1-6.

\* cited by examiner

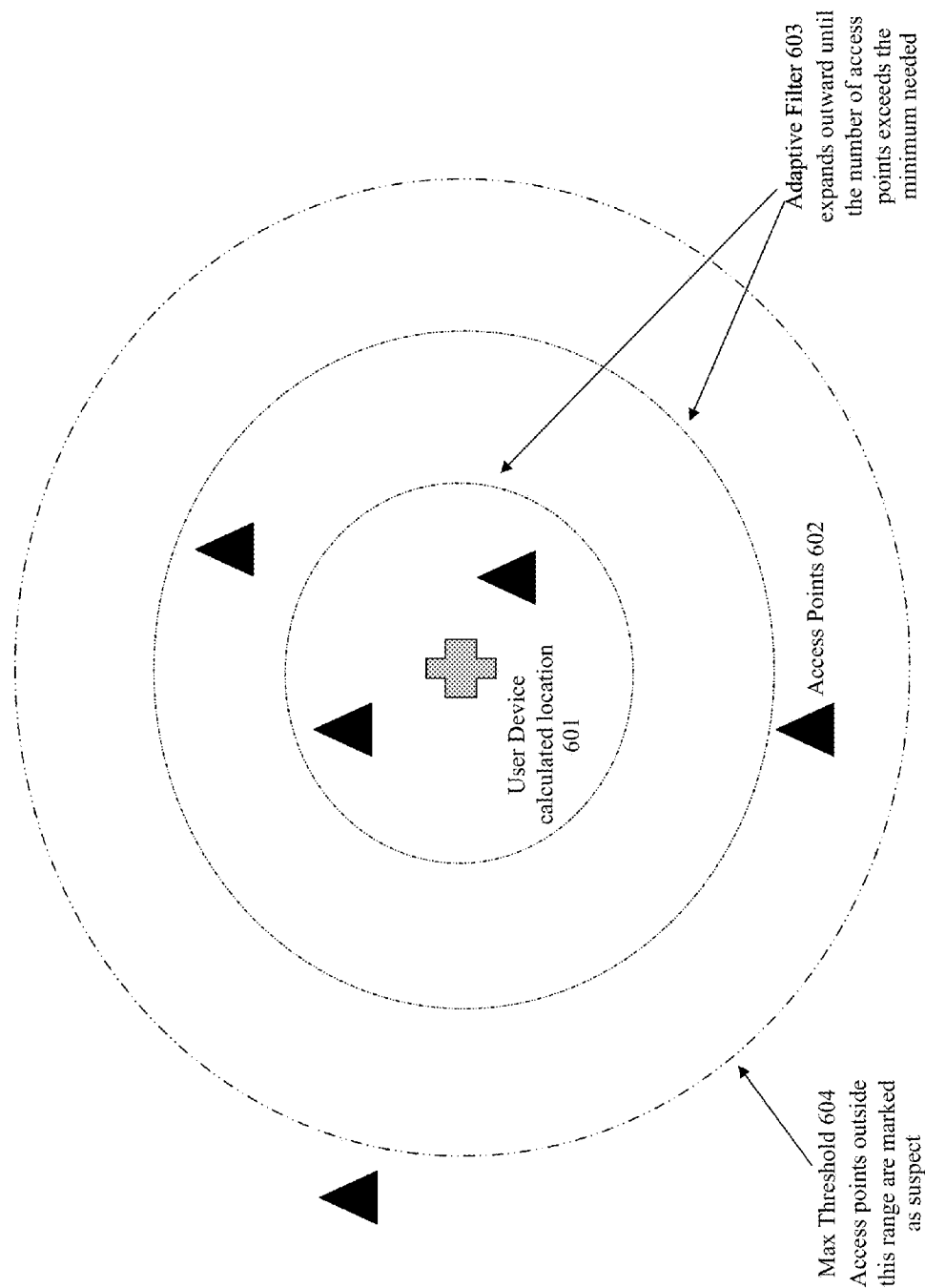

CONTINUOUS DATA OPTIMIZATION OF NEW ACCESS POINTS IN POSITIONING SYSTEMS

CROSS-REFERENCE TO RELATED APPLICATIONS

This application is a continuation of and claims the benefit under 35 U.S.C. §120 to the following application, the contents of which are incorporated herein in its entirety by reference:

U.S. patent application Ser. No. 12/371,091, filed on Feb. 13, 2009, entitled Continuous Data Optimization of New Access Points in Positioning Systems.

U.S. patent application Ser. No. 12/371,091 claims the benefit under 35 U.S.C. §119 to the following application, the contents of which are incorporated herein in its entirety by reference:

U.S. patent application Ser. No. 11/359,144, now U.S. Pat. No. 7,493,127, filed on Feb. 22, 2006, entitled Continuous Data Optimization of New Access Points in Positioning Systems.

U.S. patent application Ser. No. 11/359,144, now U.S. Pat. No. 7,493,127, claims the benefit under 35 U.S.C. §119 to the following application, the contents of which are incorporated herein in its entirety by reference:

U.S. Provisional Application No. 60/654,811, filed Feb. 22, 2005, entitled Continuous Data Optimization In Positioning System.

U.S. patent application Ser. No. 11/359,144, now U.S. Pat. No. 7,493,127, is a continuation-in-part of and claims the benefit under 35 U.S.C. §120 to the following application, the contents of which are incorporated herein in its entirety by reference:

U.S. patent application Ser. No. 11/261,988, now U.S. Pat. No. 7,305,245, filed on Oct. 28, 2005, entitled Location-Based Services that Choose Location Algorithms Based on Number of Detected Access Points Within Range of User Device.

This application is related to the following U.S. Patent Applications:

U.S. patent application Ser. No. 11/359,154, filed on Feb. 22, 2006, entitled Continuous Data Optimization of Moved Access Points in Positioning Systems;

U.S. patent application Ser. No. 11/359,271, filed on Feb. 22, 2006, entitled Continuous Data Optimization by Filtering and Positioning Systems;

U.S. patent application Ser. No. 11/365,540, filed Mar. 1, 2006, entitled Encoding and Compression of a Location Beacon Database;

U.S. patent application Ser. No. 11/261,848, filed on Oct. 28, 2005, entitled Location Beacon Database;

U.S. patent application Ser. No. 11/261,898, filed on Oct. 28, 2005, entitled Server for Updating Location Beacon Database; and U.S. patent application Ser. No. 11/261,987, filed on Oct. 28, 2005, entitled Method and System for Building a Location Beacon Database.

BACKGROUND

1. Field of the Invention

The invention is generally related to location-based services and, more specifically, to methods of continuously optimizing or improving the quality of WiFi location data in such systems.

2. Discussion of Related Art

In recent years the number of mobile computing devices has increased dramatically creating the need for more advanced mobile and wireless services. Mobile email, walkie-talkie services, multi-player gaming and call following are examples of how new applications are emerging on mobile devices. In addition, users are beginning to demand/seek applications that not only utilize their current location but also share that location information with others. Parents wish to keep track of their children, supervisors need to track the location of the company's delivery vehicles, and a business traveler looks to find the nearest pharmacy to pick up a prescription. All of these examples require the individual to know their own current location or that of someone else. To date, we all rely on asking for directions, calling someone to ask their whereabouts or having workers check-in from time to time with their position.

Location-based services are an emerging area of mobile applications that leverages the ability of new devices to calculate their current geographic position and report that to a user or to a service. Some examples of these services include local weather, traffic updates, driving directions, child trackers, buddy finders and urban concierge services. These new location sensitive devices rely on a variety of technologies that all use the same general concept. Using radio signals coming from known reference points, these devices can mathematically calculate the user's position relative to these reference points. Each of these approaches has its strengths and weaknesses based on the radio technology and the positioning algorithms they employ.

The Global Positioning System (GPS) operated by the US Government leverages dozens of orbiting satellites as reference points. These satellites broadcast radio signals that are picked up by GPS receivers. The receivers measure the time it took for that signal to reach to the receiver. After receiving signals from three or more GPS satellites the receiver can triangulate its position on the globe. For the system to work effectively, the radio signals must reach the received with little or no interference. Weather, buildings or structures and foliage can cause interference because the receivers require a clear line-of-sight to three or more satellites. Interference can also be caused by a phenomenon known as multi-path. The radio signals from the satellites bounce off physical structures causing multiple signals from the same satellite to reach a receiver at different times. Since the receiver's calculation is based on the time the signal took to reach the receiver, multi-path signals confuse the receiver and cause substantial errors.

Cell tower triangulation is another method used by wireless and cellular carriers to determine a user or device's location. The wireless network and the handheld device communicate with each other to share signal information that the network can use to calculate the location of the device. This approach was originally seen as a superior model to GPS since these signals do not require direct line of site and can penetrate buildings better. Unfortunately these approaches have proven to be suboptimal due to the heterogeneous nature of the cellular tower hardware along with the issues of multi-path signals and the lack of uniformity in the positioning of cellular towers.

Assisted GPS is a newer model that combines both GPS and cellular tower techniques to produce a more accurate and reliable location calculation for mobile users. In this model, the wireless network attempts to help GPS improve its signal reception by transmitting information about the clock offsets of the GPS satellites and the general location of the user based on the location of the connected cell tower. These techniques can help GPS receivers deal with weaker signals that one experiences indoors and helps the receiver obtain a 'fix' on the closest satellites quicker providing a faster "first reading". These systems have been plagued by slow response times and poor accuracy—greater than 100 meters in downtown areas.

There have been some more recent alternative models developed to try and address the known issues with GPS, A-GPS and cell tower positioning. One of them, known as TV-GPS, utilizes signals from television broadcast towers. (See, e.g., Muthukrishnan, Maria Lijding, Paul Havinga, Towards Smart Surroundings: Enabling Techniques and Technologies for Localization, Lecture Notes in Computer Science, Volume 3479, Jan 2Hazas, M., Scott, J., Krumm, J.: Location-Aware Computing Comes of Age. IEEE Computer, 37(2):95-97, February 2004 005, Pa005, Pages 350-362.) The concept relies on the fact that most metropolitan areas have 3 or more TV broadcast towers. A proprietary hardware chip receives TV signals from these various towers and uses the known positions of these towers as reference points. The challenges facing this model are the cost of the new hardware receiver and the limitations of using such a small set of reference points. For example, if a user is outside the perimeter of towers, the system has a difficult time providing reasonable accuracy. The classic example is a user along the shoreline. Since there are no TV towers out in the ocean, there is no way to provide reference symmetry among the reference points resulting in a calculated positioning well inland of the user.

Microsoft Corporation and Intel Corporation (via a research group known as PlaceLab) have deployed a Wi-Fi Location system using the access point locations acquired from amateur scanners (known as "wardrivers") who submit their Wi-Fi scan data to public community web sites. (See, e.g., LaMarca, A., et. al., Place Lab: Device Positioning Using Radio Beacons in the Wild.) Examples include WiGLE, Wi-FiMaps.com, Netstumbler.com and NodeDB. Both Microsoft and Intel have developed their own client software that utilizes this public wardriving data as reference locations. Because individuals voluntarily supply the data the systems suffer a number of performance and reliability problems. First, the data across the databases are not contemporaneous; some of the data is new while other portions are 3-4 years old. The age of the access point location is important since over time access points can be moved or taken offline. Second, the data is acquired using a variety of hardware and software configurations. Every 802.11 radio and antenna has different signal reception characteristics affecting the representation of the strength of the signal. Each scanning software implementation scans for Wi-Fi signals in different ways during different time intervals. Third, the user-supplied data suffers from arterial bias. Because the data is self-reported by individuals who are not following designed scanning routes, the data tends to aggregate around heavily traffic areas. Arterial bias causes a resulting location pull towards main arteries regardless of where the user is currently located causing substantial accuracy errors. Fourth, these databases include the calculated position of scanned access points rather than the raw scanning data obtained by the 802.11 hardware. Each of these databases calculates the access point location differently and each with a rudimentary weighted average formula. The result is that many access points are indicated as being located far from their actual locations including some access points being incorrectly indicated as if they were located in bodies of water.

There have been a number of commercial offerings of Wi-Fi location systems targeted at indoor positioning. (See, e.g., Kavitha Muthukrishnan, Maria Lijding, Paul Havinga, Towards Smart Surroundings: Enabling Techniques and Technologies for Localization, Lecture Notes in Computer Science, Volume 3479, Jan 2Hazas, M., Scott, J., Krumm, J.: Location-Aware Computing Comes of Age. IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy. These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for these indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly outdoor radio propagation is fundamentally different than indoor radio propagation rendering these indoor positioning algorithms almost useless in a wide-area scenario.

There are numerous 802.11 location scanning clients available that record the presence of 802.11 signals along with a GPS location reading. These software applications are operated manually and produce a log file of the readings. Examples of these applications are Netstumber, Kismet and Wi-FiFoFum. Some hobbyists use these applications to mark the locations of 802.11 access point signals they detect and share them with each other. The management of this data and the sharing of the information is all done manually. These application do not perform any calculation as to the physical location of the access point, they merely mark the location from which the access point was detected.

Performance and reliability of the underlying positioning system are the key drivers to the successful deployment of any location based service. Performance refers to the accuracy levels that the system achieves for that given use case. Reliability refers to the percentage of time that the desired performance levels are achieved.

|  | Performance | Reliability |
| --- | --- | --- |
| Local Search/Advertising | <100 meters | 85% of the time |
| E911 | <150 meters | 95% of the time |
| Turn-by-turn driving directions | 10-20 meters | 95% of the time |
| Gaming | <50 meters | 90% of the time |
| Friend finders | <500 meters | 80% of the time |
| Fleet management | <10 meters | 95% of the time |
| Indoor asset tracking | <3 meters | 95% of the time |

SUMMARY

The invention provides methods and systems of continuously optimizing data in WiFi positioning systems. For example, data is monitored to infer whether a WiFi access point has moved or is new. In this fashion, data is continuously optimized. Likewise, suspect data may be avoided when determining the position of the WiFi-enabled device using such a system.

Under one aspect of the invention, a location-based services system uses WiFi-enabled devices to monitor WiFi access points in a target area to indicate whether a WiFi access point is newly-observed. A WiFi-enabled device communicates with WiFi access points within range of the WiFi-enabled device so that observed WiFi access points identify themselves. A reference database is accessed to obtain information specifying a recorded location for each observed WiFi access point in the target area. Observed WiFi access points for which the reference database has no information specifying a corresponding recorded location are identified. The recorded location information for each of the observed WiFi access points is used to calculate the position of the WiFi-enabled device. The reference database is informed of the WiFi access points (for which there was no information in the database) and is provided the calculated position in conjunction therewith to serve as location information for the newly-observed WiFi access points.

Under another aspect of the invention, signal strength information is recorded for WiFi access points and the signal strength information is used when calculating the position of the WiFi-enabled device.

Under another aspect of the invention, the reference database is located remotely relative to the user device.

Under another aspect of the invention, Wi-Fi access points identified as new are added to the reference database immediately.

Under another aspect of the invention, WiFi access points identified as new are stored in the WiFi-enabled device and added to the reference database at a later time.

Under another aspect of the invention, the reference database is part of a location-based services system with a large plurality of subscribers each having WiFi-enabled devices with logic to determine the geographical position of the WiFi-enabled device of the respective user and the acts of identifying new access points are repeatedly performed by the large plurality of WiFi-enabled devices using the system.

BRIEF DESCRIPTION OF DRAWINGS

In the drawing,

FIG. 6 depicts the operation of the Adaptive Filter in certain embodiments.

DETAILED DESCRIPTION

Figure 1:
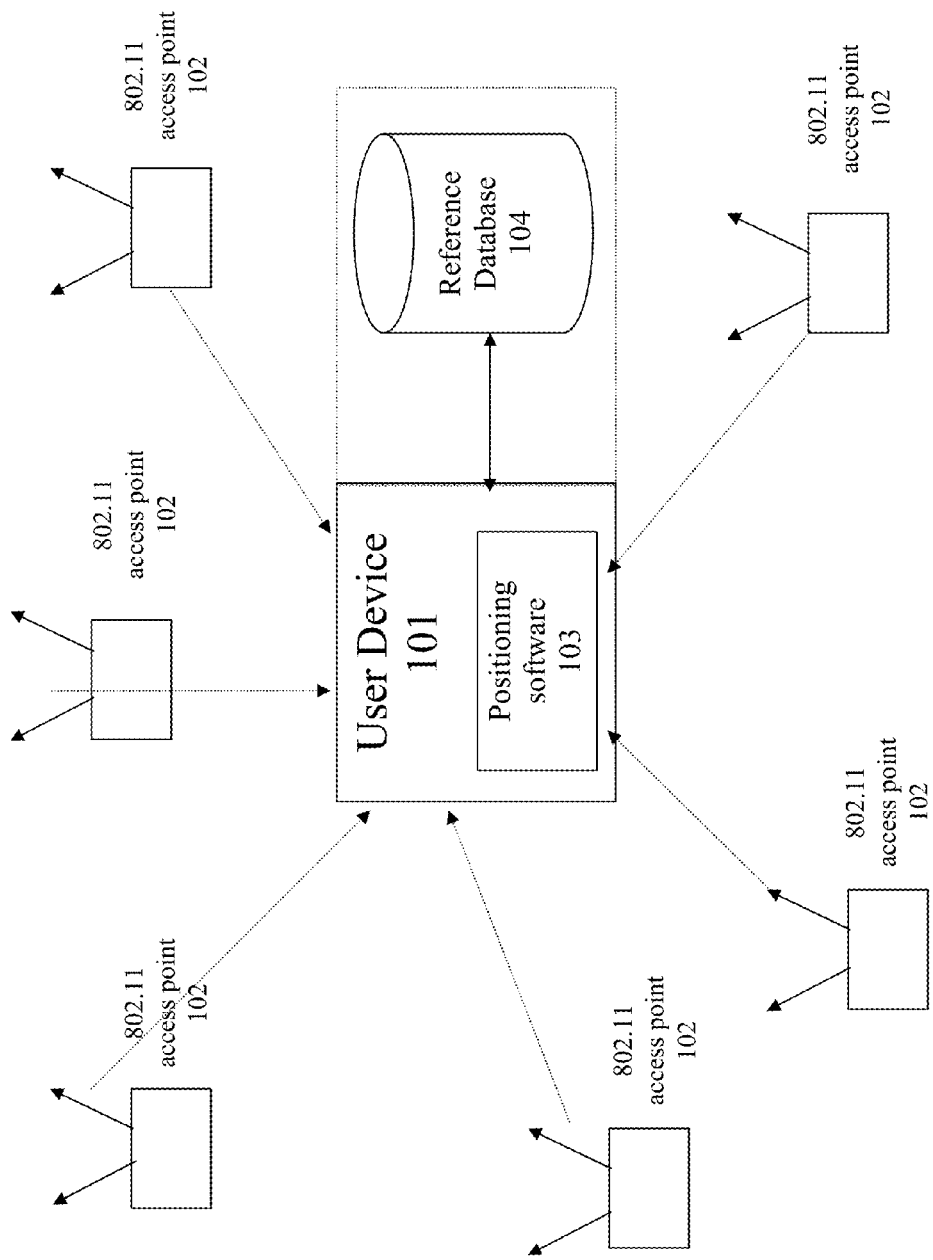
FIG. 1 depicts certain embodiments of a Wi-Fi positioning system.

Preferred embodiments of the present invention provide a system and a methodology for continuously maintaining and updating location data in a WiFi positioning system (WPS) using public and private 802.11 access points. Preferably, clients using location data gathered by the system use techniques to avoid erroneous data in determining the Wi-Fi positions and use newly-discovered position information to improve the quality of previously gathered and determined position information. Certain embodiments communicate with the central location Access Point Reference Database to provide the location of newly discovered access points. Other embodiments notify the central location Access Point Reference Database of access points whose readings fall outside the bounds of what should be expected, based on previous readings of their location. Access points whose readings fall outside of what should be expected can be marked as suspect and filtered out of the triangulation formula so as not to introduce bad data into the location calculation.

Preferred embodiments of the invention build on techniques, systems and methods disclosed in earlier filed applications, including but not limited to U.S. patent application Ser. No. 11/261,988, filed on Oct. 28, 2005, entitled Location-Based Services that Choose Location Algorithms Based on Number of Detected Access Points Within Range of User Device, the contents of which are hereby incorporated by reference in its entirety. Those applications taught specific ways to gather high quality location data for WiFi access points so that such data may be used in location based services to determine the geographic position of a WiFi-enabled device utilizing such services. In the present case, new techniques are disclosed for continuously monitoring and improving such data, for example by users detecting new access points in a target area or inferring that access points have moved. The present techniques, however, are not limited to systems and methods disclosed in the incorporated patent applications. Instead those applications disclose but one framework or context in which the present techniques may be implemented. Thus, while reference to such systems and applications may be helpful, it is not believed necessary to understand the present embodiments or inventions.

Under one embodiment of the invention, a WPS client device scans for access points to determine the physical location of the WPS client device, then it calculates the quality of the current access point locations in the Access Point Reference Database by comparing the observed readings against the recorded readings in the database. If the client determines that the observed readings fall outside the bounds of what should be expected based on the recorded readings, then the access point is marked as suspect. That suspect reading is logged into a feedback system for reporting back to the central location Access Point Reference Database.

Under another embodiment of the invention, a WPS client device filters identified suspect access points out of the triangulation calculation of the WPS client device in real time so as not to introduce bad data into the location calculation.

Under another embodiment of the invention, a WPS client device scans for access points to determine the physical location of the device and identifies access points that do not exist in the current Access Point Reference Database. After the known access points are used to calculate the device's current location, those newly found access points are recorded back to the central location Access Point Reference Database using the calculated location of the known access points to help determine their position, along with the observed power reading.

Under another embodiment of the invention, a device centric WPS client device periodically connects to the central location Access Point Reference Database to download the latest access point data. The WPS client device also uploads all feedback data about newly observed access points and suspect access points. This data is then fed into the central location Access Point Reference Database processing to recalibrate the overall system.

Under another embodiment of the invention, a network centric WPS client device directly records feedback data about newly observed access points and suspect access points into the central location Access Point Reference Database in real time.

By enlisting the WPS client device to continuously update the Access Point Reference Database with information on new and suspect access points, the WiFi positioning system provides higher quality data than a system scanned solely by the provider. Over time, WiFi access points are continually added and moved. Embodiments of the described invention provide systems and methods to ensure that the Access Point Reference Database is self-healing and self-expanding, providing optimal positioning data that continually reflects additions and changes to available access points. As more user client devices are deployed, the quality of the Access Point Reference Database improves because information in the database is updated more frequently.

FIG. 1 depicts a portion of a preferred embodiment of a Wi-Fi positioning system (WPS). The positioning system includes positioning software [103] that resides on a user-computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons or probe responses from the 802.11 access points in range and calculates the geographic location of the computing device using characteristics from the received signal beacons or probe responses.

The positioning software is described in greater detail with reference to FIG. 2, which depicts exemplary components of positioning software 103. Typically, in the user device embodiment of FIG. 1 there is an application or service [201] that utilizes location readings to provide some value to an end user (for example, driving directions). This location application makes a request of the positioning software for the location of the device at that particular moment. The location application can be initiated continuously every elapsed period of time (every 1 second for example) or one time on demand by another application or user.

Figure 2:
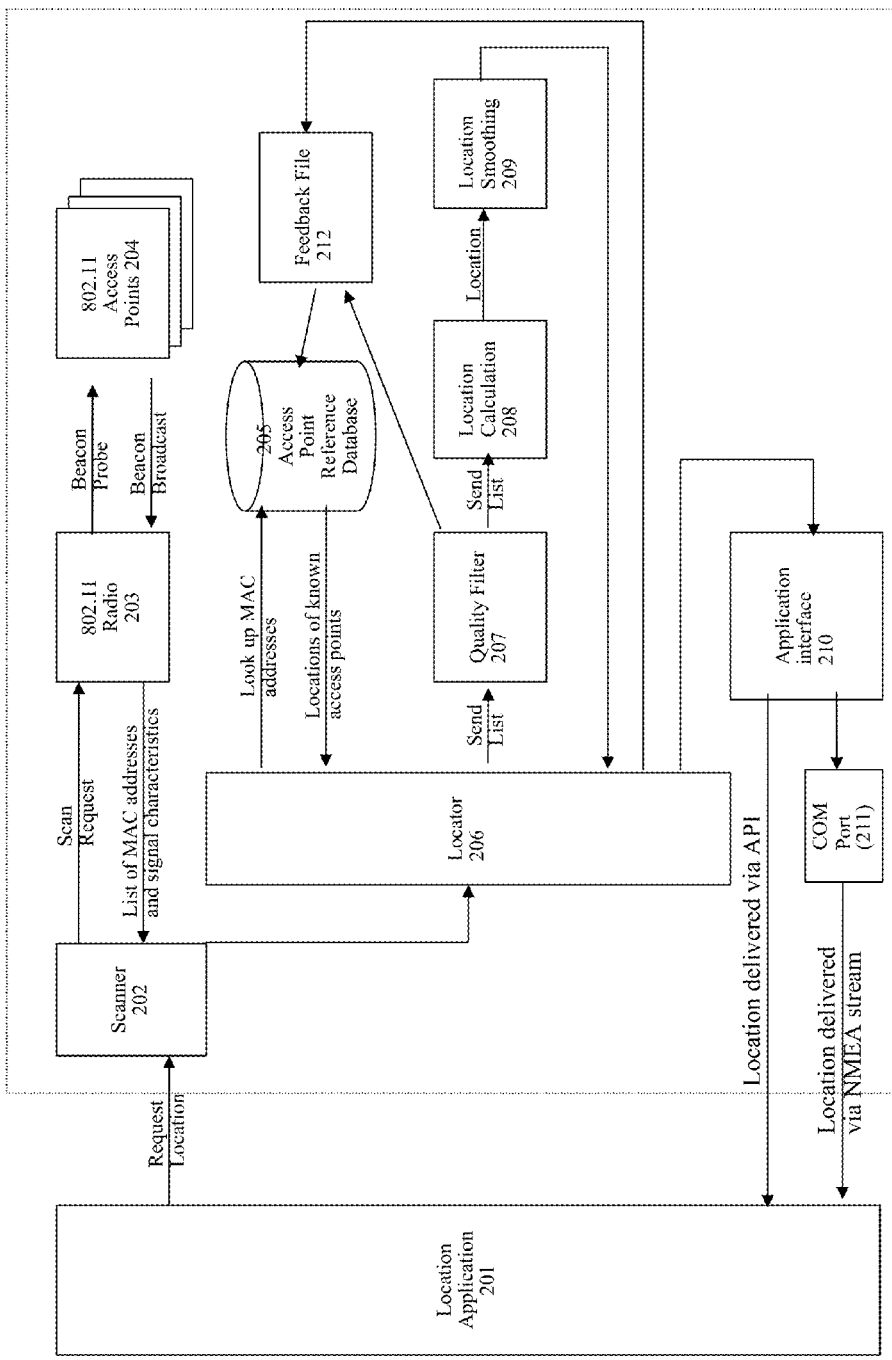
FIG. 2 depicts an exemplary architecture of positioning software according to certain embodiments of the invention.

In FIG. 2, the location application makes a request of the positioning software to interrogate all access points within range at a particular moment and to determine which access points are suspect because the observed data does not correspond to the calculated location in the Reference Database. The information on suspect access points collected by the location application is used to optimize the position information in the Access Point Reference Database either in real time or at some later time.

In the embodiment depicted in FIG. 2, the location application or service request initiates the scanner [202], which makes a "scan request" to the 802.11 radio [203] on the device. The 802.11 radio sends out a probe request to all 802.11 access points [204] within range. According to the 802.11 protocol, those access points in receipt of a probe request will transmit a broadcast beacon containing information about the access point. That beacon includes the MAC address of the device, the network name, the precise version of the protocol that it supports and its security configuration along with information about how to connect to the device. The 802.11 radio collects this information from each access point that responds, calculates the received signal strength ("RSS") of each access point observed, and sends the identification and RSS information back to the scanner.

Figure 5:
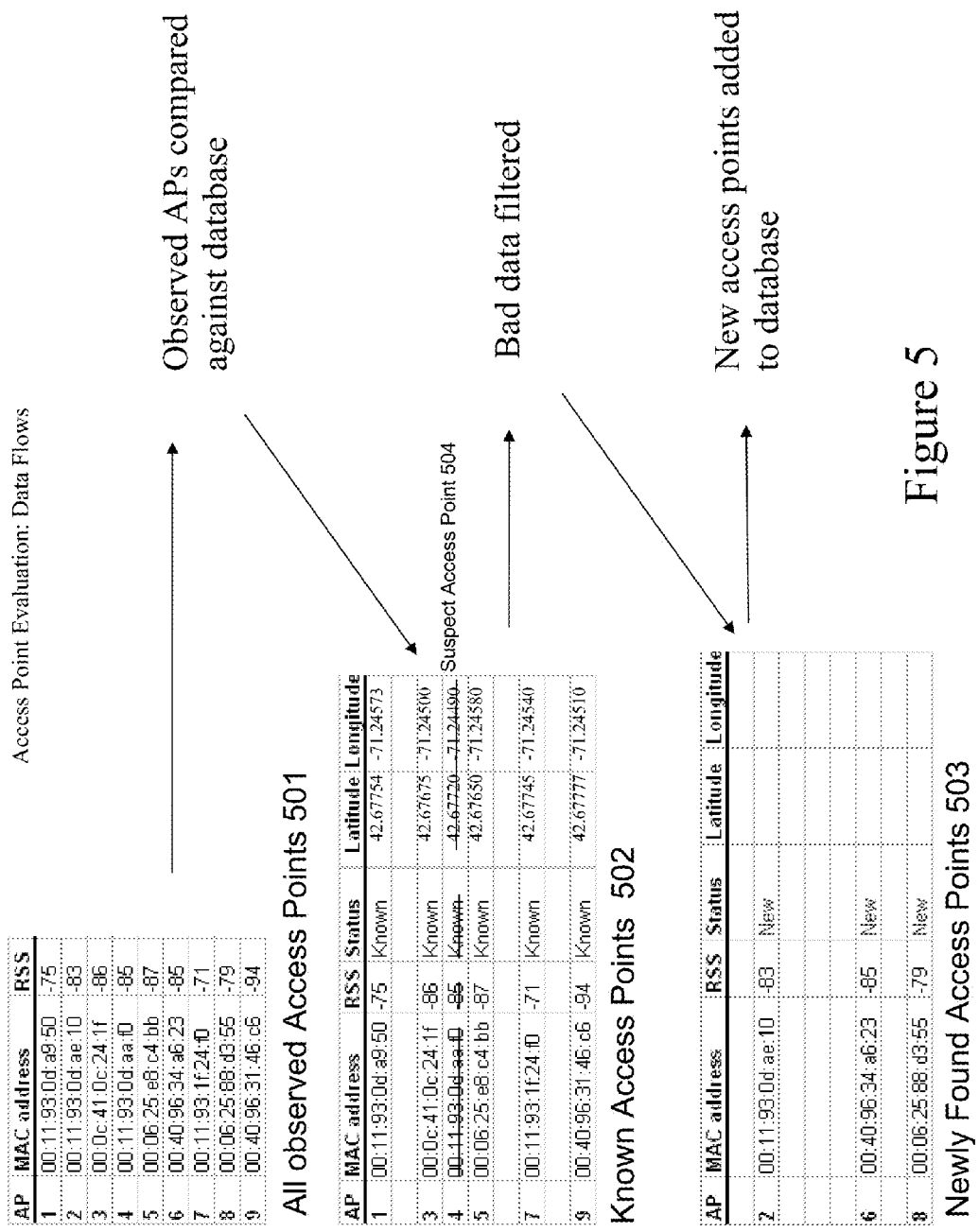
FIG. 5 depicts the data flows for the quality filtering and feedback process.

The scanner passes this array of access points to the Locator [206] which checks the MAC addresses of each observed access point against the Access Point Reference Database [205]. This database can either be located on the device or remotely over a network connection. The Access Point Reference Database contains the raw 802.11 scanning data plus the calculated location for each access point that is known to the system. FIG. 5 describes the access point evaluation process in more detail. The list of observed access points [501] is obtained from the Scanner and the Locator [206] searches for each access point in the Access Point Reference Database. For each access point found in the Access Point Reference Database the recorded location is retrieved [502]. The Locator passes this collection of location information for known access points [502] along with the signal characteristics returned from each access point to the Quality Filter [207]. This filter determines if any of the access points have moved since they were added to the Access Point Reference Database and works continually to improve the overall system. The Quality Filter marks access points that fail the quality algorithm as "suspect" [504]. After removing bad data records, the Filter sends the remaining access points to the Location Calculation component [208]. Using the set of validated reference data from the Access Point Reference Database and the signal strength readings from the Scanner, the Location Calculation component computes the location of the device at that moment. The Location Calculation component also calculates the position of any newly observed access points [503] not found in the Access Point Reference Database. The raw scanning data and the location of new access points are stored in the Feedback File [212] as can be seen in FIG. 2. This feedback is either saved locally on the device for later transmission to the server or sent to the server in real time. Before location data for known access points is sent back to the Locator, it is processed by the Smoothing engine [209] which averages a past series of location readings to remove any erratic readings from the previous calculation. The adjusted location data is then sent back to the Locator.

The calculated location readings produced by the Locator are communicated to these location-based applications [201] through the Application Interface [210] which includes an application programming interface (API) or via a virtual GPS capability [211]. GPS receivers communicate their location readings using proprietary messages or using the location standard like the one developed by the National Marine Electronics Association (NMEA). Connecting into the device using a standard interface such as a COM port on the machine retrieves the messages. Certain embodiments of the invention include a virtual GPS capability that allows any GPS compatible application to communicate with this new positioning system without have to alter the communication model or messages.

The location calculations are produced using a series of positioning algorithms intended to turn noisy data flows into reliable and steady location readings. The client software compares the list of observed access points along with their calculated signal strengths to weight the location of user to determine precise location of the device user. A variety of techniques are employed including simple signal strength weighted average models, nearest neighbor models combined with triangulation techniques and adaptive smoothing based on device velocity. Different algorithms perform better under different scenarios and tend to be used together in hybrid deployments to product the most accurate final readings. Preferred embodiments of the invention can use a number of positioning algorithms. The decision of which algorithm to use is driven by the number of access points observed and the user case application using it. The filtering models differ from traditional positioning systems since traditional systems rely on known reference points that never move. In the model of preferred embodiments, this assumption of fixed locations of access points is not made; the access points are not owned by the positioning system so they may move or be taken offline. The filtering techniques assume that some access points may no longer be located in the same place and could cause a bad location calculation. So the filtering algorithms attempt to isolate the access points that have moved since their position was recorded. The filters are dynamic and change based on the number of access points observed at that moment. The smoothing algorithms include simple position averaging as well as advanced Bayesian logic including particle filters. The velocity algorithms calculate device speed by estimating the Doppler effect from the signal strength observations of each access point.

Optimizing the Quality of Current Access Point Data

The Quality Filter [207] component compares the data from the observed access points against the known access points in a local or remote Access Point Reference Database. For those observed access points whose MAC address is located in the Access Point Reference Database, the Quality Filter component then compares the information observed with the location of the access points stored in the database.

The Quality Filter's [207] high level functionality is to remove suspect access points from location calculation and as the result, increase the accuracy of location estimation. The Quality Filter uses only access points that are located in the Access Point Reference Database. In some cases the Quality Filter will have no current client device location history to utilize for quality determination. The process for identifying suspect access points for a no-history location estimation is based on the location of the biggest cluster of the access points stored in the database. The location of all the observed access points that are recorded in the Access Point Reference Database is considered and the average location of the biggest cluster of access points is used as the reference point. A cluster refers to distance-based clustering, which is a group of access points with the distance of each access point from at least one more access point in the cluster less than a threshold. The clustering algorithm is shown as follows and it is read as "Node n belongs to cluster K, if there is at least one element in cluster K like $n_i$, which its distance from n is less than the threshold":

$$\exists n_i \epsilon(\text{cluster}K), |n-n_i| < d_{threshold} \Rightarrow n \epsilon(\text{cluster}K)$$

If no cluster can be found then the mathematical median of the access points serves as the best estimate of the distance average of a majority of the access points.

If the distance of any individual access point to the reference point is calculated to be more than a given distance, it is ruled as a suspect access point and recorded in the Feedback File to be sent back to the Access Point Reference Database. Those suspect access points are then removed from the list of access points used to calculate the location of the user device.

Identifying suspect access points for a client device when there is a history of user movement is based on the previous location of the client device. An exemplary implementation of this determination is shown in FIG. 6. In an embodiment where there is location history, the client device location calculation is calculated continuously every period of time, usually once every second. If the distance of any individual observed access point [602] to that historical reference point (the prior location calculation) is more than a given distance [603], then it is ruled as a suspect access point, added to the Feedback File and removed from calculation. The intent of this filter is to try and use the access points that are nearest to the user/device [601] to provide the highest potential accuracy. This filter is called an adaptive filter since the threshold distance to filter suspect access points is changed dynamically. The threshold distance, which is used to identify suspect access points, is changed dynamically based on the number of access points that are considered of good quality to calculate location of the client device. Therefore, the adaptive filter contains two factors, 1) the minimum number of required access points to locate a user device and 2) the minimum threshold of distance to identify suspect access points. The adaptive filter starts with the minimum threshold of distance. If number of access points within that distance is above the minimum number of access points necessary to calculate the client location, then location of the device is calculated. For example, if we find five access points which are within 20 meters of the prior reading, then we filter out all observed access points greater than 20 meters. If the filter criteria is not met then the adaptive filter threshold [603] of the distance is increased until the minimum number of access points is considered or the maximum acceptable distance is reached, and then the access points within the threshold distance are used to locate the user device. If no access point can be located within the maximum threshold of distance [604] from the previous location, then no location is calculated.

The positioning software continues to attempt to locate the device based on its previous location up to a maximum given duration of time. During this timeout period, if no location can be determined, the maximum threshold of distance is adjusted using the calculated velocity of the device. If the vehicle is known to accelerate at a maximum of 6 m/s/s and it was previously calculated as traveling at 20 mph, then it would not possible be more than 42 meters away from the last location two seconds later. This 42 meter distance limit is used to adjust the outer boundary of the distance threshold if the earlier time period adapter filters did not work. If it is too difficult to calculate the actual velocity of client device, then a maximum velocity threshold is used. If any access point is calculated to be more than the maximum threshold of distance away from the reference point, it is marked as "suspect" and logged to the Feedback File. If no access point can be located within the maximum threshold of the distance during the timeout period, then the adaptive filter ignores the history and treats the next instance of location determination as a no-history case and returns back to the clustering filter described previously.

Real-Time Filtering of Suspect Access Points

Suspect access points are removed from the inputs into the triangulation calculation and only valid access point locations are used to triangulate the device position [502]. The inputs to the triangulation algorithm are the set of valid access points returned from the Quality Filter [207]. The triangulation component reads in the list of valid observed access point locations along with their respective signal strengths and calculates a latitude and longitude along with a Horizontal Position Error (an estimate of the accuracy error at that moment). The triangulation process also takes into consideration prior positions to add additional filters to the scanning in order to apply a smoothing process. By filtering out suspect access points we provide the triangulation algorithm a more reliable set of reference points to calculate against. Since access points can move at any time, Positioning Software must account for the dynamic nature of the reference points. Without conducting filtering, the calculated location could result in a position hundreds or thousands of miles away.

Suspect access points are not discarded completely. Rather their newly observed locations are added back to the database via the Feedback File [212] with different attributes indicating it as suspect, allowing the server to determine whether to move the official location of that access point or just keep it on hold until its new location can be verified. By keeping it on hold, this access point will not corrupt any other user's location calculation.

Adding New Access Point Data

Observed access points found in the Access Point Reference Database of known access points are used to calculate the location of the client device after the elimination of suspect access points. Observed access points whose MAC address are not found in the Access Point Reference Database represent new access points [302][503] added since the database was created or updated. Those observed access points not found in the known Access Point Reference Database are added to the Feedback File as new access points. Those newly found access points are marked with the location of the client device calculated by the positioning system itself along with the observed signal strengths. This situation can occur in a number of scenarios. In many cases a new access point is purchased and deployed in the vicinity since the last physical scanning by the scanning fleet. This is most often the case due to the rapid expansion of Wi-Fi. In other cases, an access point may be situated deep in the center of a building and the scanning fleet was unable to detect that access point from the street. Another example is that an access point may be located up on a high floor of a tall building. These access points may be difficult to detect from down on the street where the scanning fleet operates, but may be received by client devices that pass closer to the building by users on foot or that enter the building itself.

By having the system "self-expand" in this manner, the coverage area of the system slowly expands deep into buildings and upwards in tall buildings. It also leverages the large number of new access points that are deployed every day across the world.

Updating the Central Database Server

Figure 3:
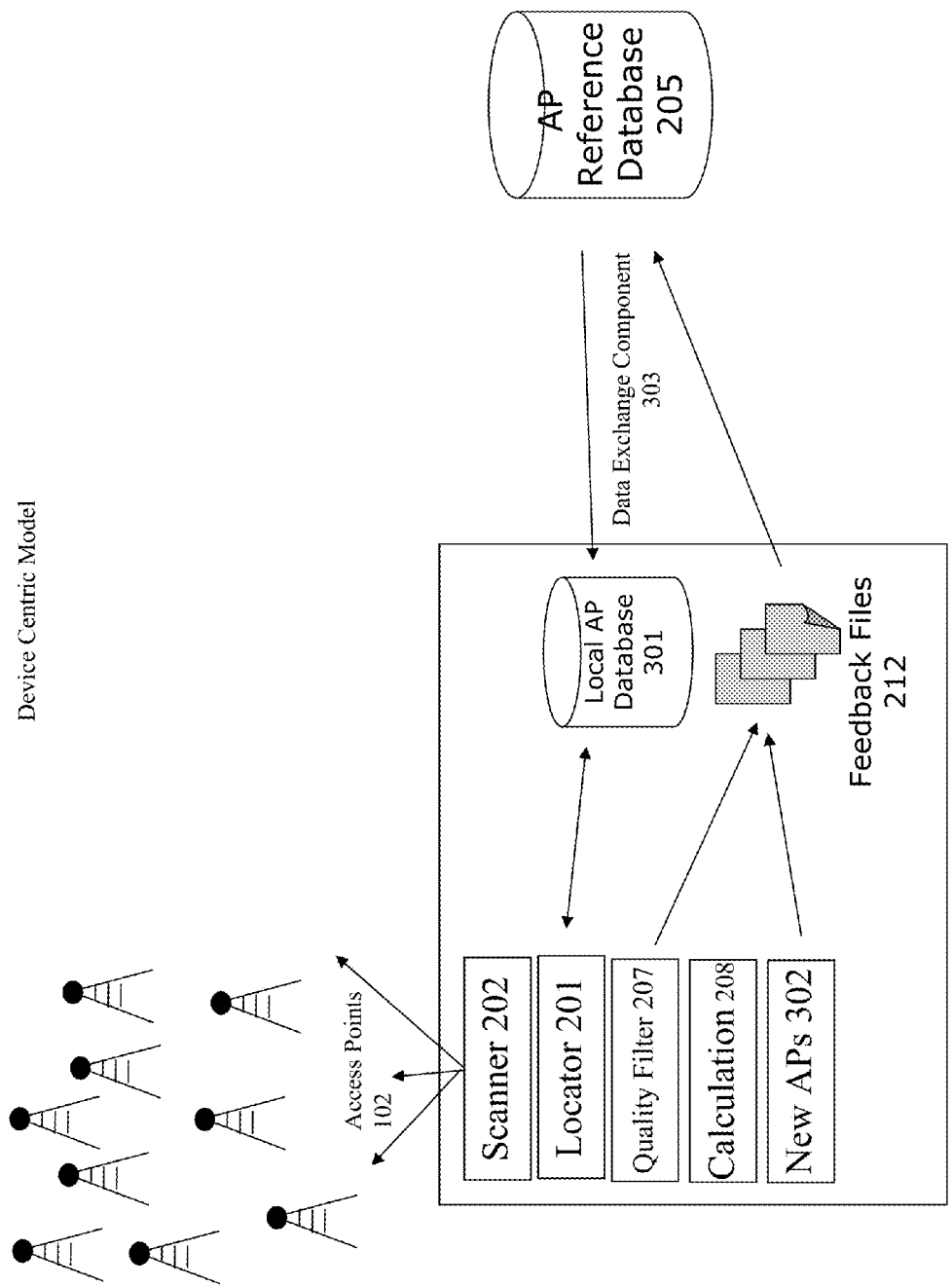
FIG. 3 depicts the data transfer process in certain client device centric embodiments.

With reference to FIG. 3, in some embodiments the Access Point Reference Database of known access points will be located on a central network server remote from the client device. The provisioning of this connection could be done via any available network connection and is managed by the Data Exchange Component [303]. Once authenticated, the client device [103] identifies all the suspect and new access point data from the local storage Feedback Files [212] and uploads that data to the Access Point Reference Database [205].

Figure 4:
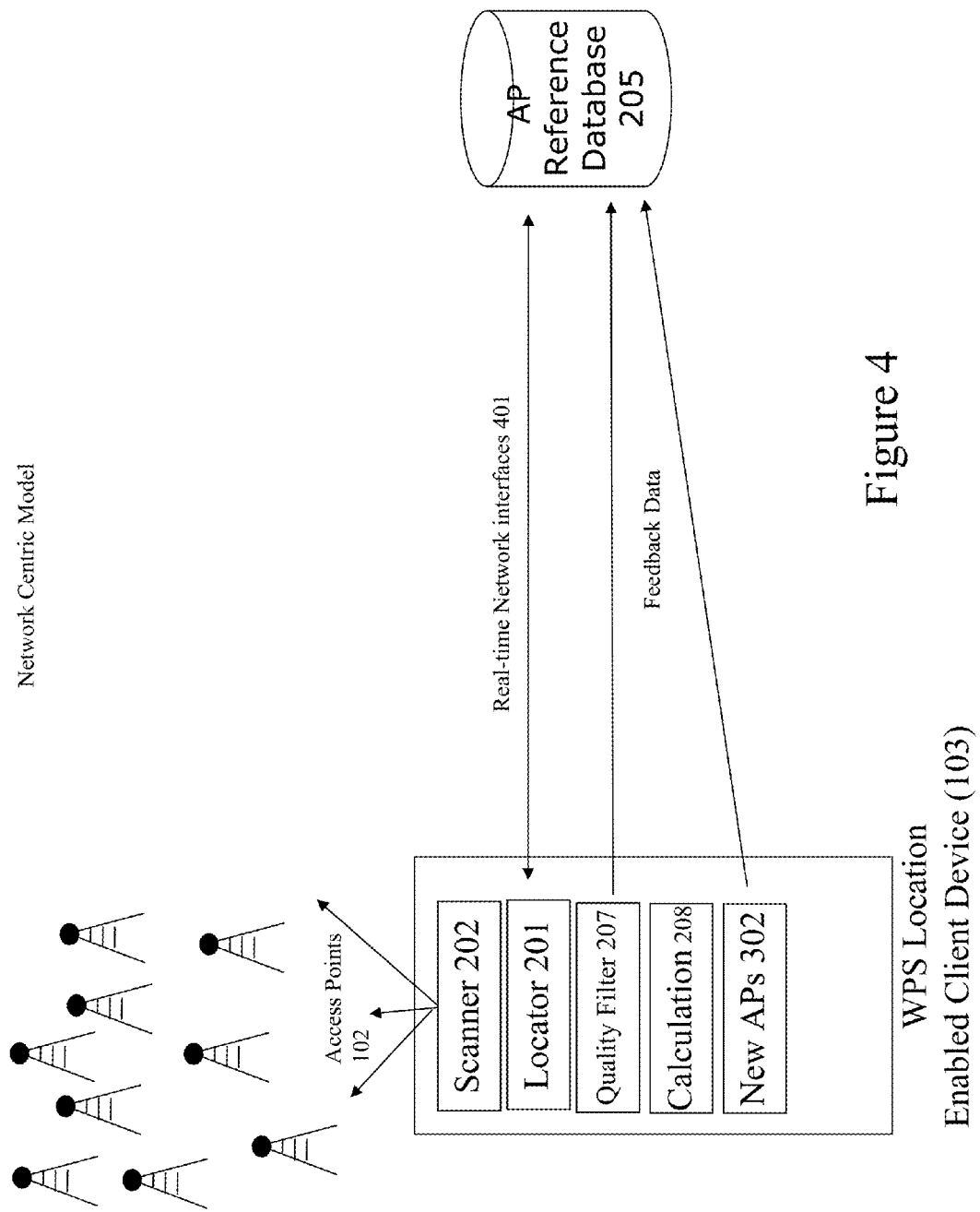
FIG. 4 depicts the data transfer process in certain network centric embodiments.

In other embodiments the client device is connected to the Access Point Reference Database all the time using a network connection. FIG. 4 describes how the Network Centric embodiment works. Rather than store the reference data locally, the Locator [201] uses a set of Real-Time Network interfaces [401] to communicate with the Access Point Reference Ratabase. The Locator sends the list of observed access points to the network interface which returns the list of observed access points and whether the database has recorded locations or whether the access points are newly found. The process continues as before with the Quality Filter marking suspect access points but the list of suspect access points is sent to the Access Point Reference Database in real-time. After the Calculation module determines the user device's location, the list of newly found access points is marked with the current location and sent back to the database in real-time. This allows the database to be up to date at all times and to remove the need for a Data Exchange Component.

After receiving feedback data, in either the device centric or the network centric model, the Access Point Reference Database determines whether to place suspect access points 'on hold' so as to prevent them from corrupting another user device's location request. There are a number of techniques being explored to optimize how this feedback data of suspect access points will be used to improve the overall quality of the database. There may be a voting scheme by which access points are moved to new positions if more than one user locates the access point in its new location. If only one user has marked the access point as suspect then the access point is marked as a low quality reading in its new position. Once its new position is validated by another user then the quality attribute of the access point is increased to reflect the higher level of confidence the system has in the new position. The more people who corroborate the access point's new position the higher the quality level. The system's client software then favors access points with high quality ratings over those that have lower quality ratings.

In either the device centric or the network centric model, the Access Point Reference Database collects the access point identifying information, client device location and access point signal strength information of newly discovered access points from client devices. Once an acceptable number of readings of newly discovered access points is collected by the Access Point Reference Database, it can calculate a location for the new access points based on the systems and methods described in the related applications. The newly discovered access points can then be supplied to client devices for use in their location calculation.

It will be appreciated that the scope of the present invention is not limited to the above-described embodiments, but rather is defined by the appended claims; and that these claims will encompass modifications of and improvements to what has been described.

What is claimed is:

1. A method of utilizing WiFi-enabled devices to monitor WiFi access points in an area, the method comprising:
   a) receiving information identifying observed WiFi access points within range of a WiFi-enabled device;
   b) identifying one or more of the observed WiFi access points for which a reference database has no information specifying a corresponding recorded location;
   c) determining an estimated position of the WiFi-enabled device from one or more of the observed WiFi access points for which the reference database has information specifying the corresponding recorded location;
   d) determining location information for the WiFi access points identified in act (b) for which the reference database has no information specifying the corresponding recorded location, based at least in part on the estimated position determined for the WiFi-enabled device in act (c) from the one or more of the observed WiFi access points for which the reference database has information specifying the corresponding recorded location;
   e) inform the reference database of the WiFi access points identified in act (b) and the location information determined in act (d).

2. The method of claim 1 wherein the determining the estimated position of the WiFi-enabled device includes:
   accessing the reference database to obtain information specifying the recorded location for the one or more of the observed WiFi access points in act (c); and
   using the recorded location information accessed in the reference database when determining the estimated position of the WiFi-enabled device.

3. The method of claim 1 wherein the determining location information for the WiFi access points identified in act (b) further includes:
  recording signal strength information for the WiFi access points identified in act (b); and
  using the signal strength information when determining the location information for the WiFi access points identified in act (b).

4. The method of claim 1 wherein the reference database is located remotely relative to the WiFi-enabled device.

5. The method of claim 1 wherein the WiFi access points identified in act (b) are added to the reference database immediately.

6. The method of claim 1 wherein the WiFi access points identified in act (b) are stored in the WiFi-enabled device and added to the reference database at a later time.

7. The method of claim 1 wherein the location information for the WiFi access points identified in act (b) is determined based at least in part on one or more of:
  (i) the recorded location information of the one or more of the WiFi access points identified in act (c),
  (ii) signal characteristics observed from one or more of the WiFi access points identified in act (c),
  (iii) scanning data describing one or more of the WiFi access points identified in act (c), and
  (iv) an accuracy of the location information of one or more of the WiFi access points identified in act (c).

8. The method of claim 1 wherein the act of determining the location information for the WiFi access points identified in act (b) is based at least in part on a set of estimated position information from a plurality of WiFi-enabled devices.

9. The method of claim 8 further comprising applying a smoothing algorithm to the set of estimated position information from the plurality of WiFi-enabled devices to form a subset of estimated position information, wherein the act of determining location information for the WiFi access points identified in act (b) is based at least in part on the subset of estimated position information.

10. The method of claim 9 wherein the smoothing algorithm includes at least one of position averaging and Bayesian logic.

11. The method of claim 9 wherein the smoothing algorithm removes erratic readings from the set of estimated position information when forming the subset of estimated position information.

12. A method of utilizing WiFi-enabled devices to monitor WiFi access points in an area, the method comprising:
  a) receiving observation information for a WiFi-enabled device having observed WiFi access points within range of the WiFi-enabled device, the observation information including information identifying observed WiFi access points and corresponding observed signal information characterizing radio signals of the observed WiFi access points received by the WiFi-enabled device;
  b) accessing a reference database to obtain information specifying a recorded location for one or more of the observed WiFi access points;
  c) identifying one or more of the observed WiFi access points for which the reference database has no information specifying a corresponding recorded location;
  d) determining a set of possible estimated positions of at least one of the WiFi access points identified in act (c) based at least in part on the recorded location information from act (b) and the observed signal information;
  e) applying a smoothing algorithm to the set of possible estimated positions of act (d) to form a subset of possible estimated positions of the at least one of the WiFi access points identified in act (c); and
  f) informing the reference database of the at least one of the WiFi access points identified in act (c) and of a corresponding estimated position of the at least one WiFi access points based on the subset of possible estimated positions of the at least one of the WiFi access points.

13. The method of claim 12 wherein the smoothing algorithm includes at least one of position averaging and Bayesian logic.

14. The method of claim 12 wherein the smoothing algorithm removes erratic readings from the set of possible estimated positions when forming the subset of estimated positions.

15. The method of claim 12 wherein the observed signal information includes signal strength information.

16. The method of claim 12 wherein the reference database is located remotely relative to the WiFi-enabled device.

17. The method of claim 12 wherein the at least one of the WiFi access points identified in act (c) is added to the reference database immediately.

18. The method of claim 12 wherein the at least one of the WiFi access points identified in act (c) is stored in the WiFi-enabled device and added to the reference database at a later time.

19. A system for utilizing WiFi-enabled devices to monitor WiFi access points in an area, the system comprising:
  a computer memory store comprising instructions in computer readable form that when executed cause a computer system to
    a) receive information identifying observed WiFi access points within range of a WiFi-enabled device;
    b) identify one or more of the observed WiFi access points for which a reference database has no information specifying a corresponding recorded location;
    c) determine an estimated position of the WiFi-enabled device based on one or more of the observed WiFi access points for which the reference database has information specifying corresponding recorded location; and
    d) determine location information for the identified WiFi access points for which the reference database has no information specifying the corresponding recorded location based at least in part on the estimated position determined for the WiFi-enabled device from the one or more of the observed WiFi access points for which the reference database has information specifying the corresponding recorded location; and
    e) inform the reference database of the identified WiFi access points and the location information.

20. The system of claim 19 wherein the instructions that cause the system to determine the estimated position of the WiFi-enabled device include instructions that cause the system to:
  access the reference database to obtain information specifying the recorded location for the one or more of the observed WiFi access points for which the reference database has information specifying corresponding recorded location; and
  use the recorded location information accessed in the reference database when determining the estimated position of the WiFi-enabled device.

21. The system of claim 19 wherein the instructions that cause the system to determine location information for the identified WiFi access points further include instructions that cause the system to:

record signal strength information for the identified WiFi access points; and use the signal strength information when determining the location information for the identified WiFi access points.

22. The system of claim 19 wherein the reference database is located remotely relative to the WiFi-enabled device.

23. The system of claim 19 wherein the identified WiFi access points are added to the reference database immediately.

24. The system of claim 19 wherein the identified WiFi access points are stored in the WiFi-enabled device and added to the reference database at a later time.

25. The system of claim 19 wherein the location information for the identified WiFi access points is determined based at least in part on one or more of:
  (i) the recorded location information of the one or more of the identified WiFi access points,
  (ii) signal characteristics observed from one or more of the identified WiFi access points,
  (iii) scanning data describing one or more of the identified WiFi access points, and
  (iv) an accuracy of the location information of one or more of the identified WiFi access points.

26. The system of claim 19 wherein the instructions that cause the system to determine the location information for the identified WiFi access points are based at least in part on a set of estimated position information from a plurality of WiFi-enabled devices.

27. The system of claim 26, the computer memory store further comprising instructions that cause the system to apply a smoothing algorithm to the set of estimated position information from the plurality of WiFi-enabled devices to form a subset of estimated position information, wherein the instructions that cause the system to determine location information for the identified WiFi access points are based at least in part on the subset of estimated position information.

28. The system of claim 27 wherein the smoothing algorithm includes at least one of position averaging and Bayesian logic.

29. The system of claim 27 wherein the smoothing algorithm removes erratic readings from the set of estimated position information when forming the subset of estimated position information.

30. A system for utilizing WiFi-enabled devices to monitor WiFi access points in an area, the system comprising:
  a computer memory store comprising instructions in computer readable form that when executed cause a system to
  a) receive observation information for a WiFi-enabled device having observed WiFi access points within range of the WiFi-enabled device, the observation information including information identifying observed WiFi access points and corresponding observed signal information characterizing radio signals of the observed WiFi access points received by the WiFi-enabled device;
  b) access a reference database to obtain information specifying a recorded location for one or more of the observed WiFi access points;
  c) identify one or more of the observed WiFi access points for which the reference database has no information specifying a corresponding recorded location;
  d) determine a set of possible estimated positions of at least one of the identified WiFi access points based at least in part on the accessed recorded location information and the observed signal information;
  e) apply a smoothing algorithm to the determined set of possible estimated positions to form a subset of possible estimated positions of the at least one of the identified WiFi access points; and
  f) inform the reference database of the at least one of the identified WiFi access points and of a corresponding estimated position of the at least one of the WiFi access points based on the subset of possible estimated positions of the at least one of the WiFi access points.

31. The system of claim 30 wherein the smoothing algorithm includes at least one of position averaging and Bayesian logic.

32. The system of claim 30 wherein the smoothing algorithm removes erratic readings from the set of possible estimated positions when forming the subset of estimated positions.

33. The system of claim 30 wherein the observed signal information includes signal strength information.

34. The system of claim 30 wherein the reference database is located remotely relative to the WiFi-enabled device.

35. The system of claim 30 wherein the identified WiFi access points are added to the reference database immediately.

36. The system of claim 30 wherein the identified WiFi access points are stored in the WiFi-enabled device and added to the reference database at a later time.

* * * * *

UNITED STATES PATENT AND TRADEMARK OFFICE
CERTIFICATE OF CORRECTION

| | | |
|---|---|---|
| PATENT NO. | : 9,037,162 B2 | Page 1 of 1 |
| APPLICATION NO. | : 13/424750 | |
| DATED | : May 19, 2015 | |
| INVENTOR(S) | : Edward J. Morgan et al. | |

It is certified that error appears in the above-identified patent and that said Letters Patent is hereby corrected as shown below:

In the Specification:

Col. 11, line 56 should read:
erence Database. The Locator sends the list of observed Signed and Sealed this
Twenty-seventh Day of October, 2015

Michelle K. Lee
*Director of the United States Patent and Trademark Office*